United States Patent
Kim et al.

(10) Patent No.: US 10,927,296 B2
(45) Date of Patent: Feb. 23, 2021

(54) SINGLE-BAND UPCONVERSION LUMINESCENT MATERIAL AND METHOD FOR PRODUCING THE SAME

(71) Applicant: Research & Business Foundation Sungkyunkwan University, Suwon-si (KR)

(72) Inventors: Dong Hwan Kim, Suwon-si (KR); Byeong Seok Moon, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 259 days.

(21) Appl. No.: 16/264,813

(22) Filed: Feb. 1, 2019

(65) Prior Publication Data
US 2019/0233724 A1   Aug. 1, 2019

(30) Foreign Application Priority Data

Feb. 1, 2018   (KR) .................. 10-2018-0012632

(51) Int. Cl.
| | |
|---|---|
| C09K 11/77 | (2006.01) |
| C09K 11/02 | (2006.01) |
| C03C 3/12 | (2006.01) |
| C03C 3/32 | (2006.01) |
| C03C 4/12 | (2006.01) |
| C03C 3/095 | (2006.01) |

(52) U.S. Cl.
CPC .............. *C09K 11/77* (2013.01); *C03C 3/095* (2013.01); *C03C 3/12* (2013.01); *C03C 3/325* (2013.01); *C03C 4/12* (2013.01); *C09K 11/025* (2013.01); *C09K 11/7766* (2013.01); *C09K 11/7773* (2013.01)

(58) Field of Classification Search
CPC ... C09K 11/77; C09K 11/025; C09K 11/7766; C09K 11/7773; C03C 3/095; C03C 3/12; C03C 3/325; C03C 4/12
See application file for complete search history.

(56) References Cited

U.S. PATENT DOCUMENTS 3,816,576 A * 6/1974 Auzel ....................... G02F 2/02
                                                264/1.21
5,399,499 A * 3/1995 Paz-Pujalt ................. G01J 3/10
                                                250/504 R

OTHER PUBLICATIONS

Zhou, Lei et al., "Single-band upconversion nanoprobes for multi-plexed simultaneous in situ molecular mapping of cancer biomarkers", *Nature Communications*, vol. 6, Article No. 6938, Apr. 24, 2015 (pp. 1-12).

* cited by examiner

*Primary Examiner* — C Melissa Koslow
(74) *Attorney, Agent, or Firm* — NSIP Law

(57) ABSTRACT

A single-band upconversion luminescent material includes an amorphous ceramic host; and lanthanide ions doped into the ceramic host.

32 Claims, 27 Drawing Sheets

Laser-induced full melting and instant quenching process

Pre-treatment
1. SiO$_2$ coating on β-NaYF$_4$: Stabilizer of amorphous phase
2. Mild baking at 250 °C: To facilitate laser melting process
3. Crumble deposition: To prevent heat flow outward from laser spot Cross-sectional investigation of liquid-quenched amorphous NaYF$_4$:SiO$_2$ (A-NaYF$_4$:SiO$_2$)

Normalized integrated intensity over the entire visible range (400-700 nm) and over three color ranges (blue, green, and red: 400-500, 500-600, and 600-700 nm, respectively)

Liquid-quenched amorphous $Y_2O_3$:$SiO_2$.

SINGLE-BAND UPCONVERSION LUMINESCENT MATERIAL AND METHOD FOR PRODUCING THE SAME

CROSS-REFERENCE TO RELATED APPLICATION

This application claims a benefit under 35 U.S.C. § 119(a) of Korean Patent Application No. 10-2018-0012632 filed on Feb. 1, 2018, on the Korean Intellectual Property Office, the entire disclosure of which is incorporated herein by reference for all purposes.

BACKGROUND

1. Field

The present disclosure relates to a single-band upconversion luminescent material and a method for producing the same.

2. Description of Related Art

Lanthanide ($Ln^{3+}$)-doped upconversion materials converting sequentially absorbed low-energy photons into a higher-energy photon have advanced dramatically over the past half-century because of their excellent photostability, sharp linewidth with fixed spectral positions and low-threshold pumping power. In particular, the unique use of near-infrared (NIR) photons in visible-light applications has given birth to emerging research fields such as deep-tissue bioimaging, energy harvesters for solar cells and volumetric 3D displays.

However, the use of upconversion materials for practical applications demands exquisite control of the upconversion spectra and efficient energy conversion.

Because the upconversion of $Ln^{3+}$ generally provides multiband emission originating from its abundant 4f intermediate states, one of the long-standing issues in exploiting upconversion luminescence is to achieve efficient single-band emission for applications where the crosstalk of individual color units must be avoided, such as multiplexed molecular imaging, color displays and security coding.

In addition, given that multiband emission causes distribution of the available energy into several frequencies, single-band emission is preferred when high conversion efficiency of a photonic device is required, such as in non-linear photonic devices.

One strategy to obtain single-band emission of upconversion is to filter out unwanted spectral bands using fluorescence-absorbing dyes or the surface quenching effect. Although this approach is straightforward and applicable to various systems, the upconversion efficiency appears to be inferior to that of multiband emission because of the considerable energy loss of the filtered emission band.

Thus, for high upconversion efficiency, the concentration of upconversion pathways on a specific spectral band through non-radiative energy transfers, such as cross-relaxation, energy back transfer, or transition metal ion mediation is preferred. Alternatively, with the assistance of an automated screening system, a new combination of multiple $Ln^{3+}$ ions that possesses a unitary upconversion pathway as a result of complex non-radiative energy transfers between dopants was demonstrated. However, the upconversion pathways via various non-radiative energy transfers fatally inherit the dissipative energy loss via phonon relaxation. As a result of the aforementioned limitations, single-band emissions with high upconversion efficiency in comparison with their multiband counterparts have been realized only for the red or NIR region.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure aims to provide a single-band upconversion luminescent material which overcomes the problems and limitations of the prior art.

In particular, the present disclosure aims to provide a luminescent material with upconversion efficiency higher than that of the multi-band emission and also with upconversion performance to the green and blue lights in addition the red light.

Further, the present disclosure aims to provide a high efficiency green single-band upconversion luminescence using a lanthanide ion (e.g., $Er^{3+}$) embedded in a liquid-quenched amorphous matrix.

In a first aspect of the present disclosure, there is provided a single-band upconversion luminescent material comprising: an amorphous ceramic host; and lanthanide ions doped into the ceramic host. The present inventor has unexpectedly discovered that the amorphous ceramic host allows the lanthanide ions to exhibit the single-band upconversion of infrared rays into visible rays.

In one embodiment of the first aspect, the amorphous ceramic host is an amorphous matrix resulting from liquid-quenching of a crystalline ceramic. The ceramic host with an amorphous state according to the present disclosure may be achieved by liquid-quenching the fully melted ceramic.

In one embodiment of the first aspect, the amorphous ceramic host has a non-glass state. A material having the non-glass state refers to a material that does not have a short-range order (first coordination), unlike ordinary glass-state amorphous materials.

In one embodiment of the first aspect, the ceramic amorphous host has a relative value $\Omega^r_2(\Omega_2/\Sigma\Omega_\lambda)$ of Judd-Ofelt parameters $\Omega_2$, $\Omega_4$ and $\Omega_6$ being equal to or greater than 0.75. That is, the ceramic amorphous host has a relative value $\Omega^r_2(\Omega_2/\Sigma\Omega_\lambda)$ of Judd-Ofelt parameters $\Omega_2$, $\Omega_4$ and $\Omega_6$ being equal to or greater than 0.75 and has a relative value $\Omega^r_4(\Omega_4/\Sigma\Omega_\lambda)$ being equal to or smaller than 0.25. The amorphous ceramic host is unexpectedly found to allow the lanthanide ions to exhibit the single-band upconversion of the infrared ray to visible ray.

The amorphous state according to the present disclosure is characterized to be non-glass amorphous state. The amorphous state may be divided into an amorphous state having a glass state and an amorphous state having a non-glass state. A material having the glass state refers to a material that dominantly has a short-range order (first coordination) and that has little or no medium or long-range order. The material having this glass state has the characteristic that when the external energy is applied thereto, the structure thereof is disturbed and the material is softened beyond the glass transition temperature (reversible).

On the other hand, a material having a non-glass state refers to a material that has little or no short-range order. This type of a material has a substantially similar structure to the atomic arrangement in the grain boundary in the solid material. For example, this type of a material refers to a material that consists only of very small grains and has only grain boundary characteristics. This type of a material may be easily recrystallized by receiving external energy.

In one embodiment of the first aspect, the amorphous ceramic host is a host containing $NaYF_4$ or $Y_2O_3$. In one embodiment of the first aspect, the lanthanide ions include $Er^{3+}$ or $Tm^{3+}$ ions.

In one embodiment of the first aspect, the ceramic amorphous host contains an amorphous phase stabilizer. In one embodiment of the first aspect, the amorphous phase stabilizer includes $SiO_2$ or $TiO_2$. The amorphous phase stabilizer may help maintain and improve the amorphous state in accordance with the present disclosure.

In one embodiment of the first aspect, the upconversion luminescent material has an asymmetric and covalent bond-based microstructure.

In one embodiment of the first aspect, the lanthanide ions include $Er^{3+}$ ions, wherein the single-band upconversion luminescent material has a $^2H_{11/2} \rightarrow {}^4I_{15/2}$ transition possibility.

In one embodiment of the first aspect, the lanthanide ions include $Tm^{3+}$ ions, wherein the single-band upconversion luminescent material has a $^1G_4 \rightarrow {}^3H_6$ transition possibility.

In one embodiment of the first aspect, the upconversion luminescent material has a decay time smaller than or equal to 0.2 µs.

In one embodiment of the first aspect, the single-band upconversion luminescent material exhibits upconversion emission to blue and green regions.

In a second aspect of the present disclosure, there is provided a method for producing single-band upconversion luminescent material, the method comprising: providing ceramic nanocrystals doped with lanthanide ions; coating an amorphous phase stabilizer on the ceramic nanocrystals; fully melting the ceramic nanocrystals to form a melt; and liquid-quenching the melt.

In one embodiment of the second aspect, the fully melting comprises fully melting the nanocrystals using a focused laser beam. In one embodiment of the second aspect, a diameter of a spot of the laser beam is equal to or smaller than 4 µm. The heating of the nanocrystals by the laser beam may achieve the molten state faster and more fully than by other heating means. Further, the amorphous state required according to the present disclosure may be achieved by the liquid-quenching after the fully melting. Furthermore, the uniform and fast fully melting of the nanocrystals may be achieved by setting the spot size of the laser beam to 4 µm or smaller. Thus, the subsequent liquid-quenching may achieve the amorphous state required in accordance with the present disclosure.

In one embodiment of the second aspect, the ceramic nanocrystals are β-$NaYF_4$ nanocrystals.

In one embodiment of the second aspect, the ceramic nanocrystals include $NaYF_4$ or $Y_2O_3$ nanocrystals. In one embodiment of the second aspect, the ceramic of the ceramic nanocrystals includes $NaYF_4$ or $Y_2O_3$.

In one embodiment of the second aspect, the lanthanide ions include $Er^{3+}$ or $Tm^{3+}$ ions.

In one embodiment of the second aspect, the ceramic amorphous host contains an amorphous phase stabilizer. In one embodiment of the second aspect, the amorphous phase stabilizer includes $SiO_2$ or $TiO_2$.

In accordance with the present disclosure, the non-glass and amorphous material was formed via rapid heating using a laser in melting the ceramic nanoparticles and the subsequent quenching. However, it was confirmed that the material having the composition of $NaYF_4$ was formed into a semi-crystalline state when using only the laser beam. Thus, in accordance with the present disclosure, the addition of $SiO_2$ may allow obtaining a completely non-glass amorphous state.

In a third aspect of the present disclosure, there is provided a single-band upconversion luminescent material produced using the method as defined above, wherein the single-band upconversion luminescent material comprises: an amorphous ceramic host; and lanthanide ions doped into the ceramic host.

In one embodiment of the third aspect, the ceramic amorphous host has a relative value $\Omega^r_2(\Omega_2/\Sigma\Omega_\lambda)$ of Judd-Ofelt parameters $\Omega_2$, $\Omega_4$ and $\Omega_6$ being equal to or greater than 0.75. That is, the ceramic amorphous host has a relative value $\Omega^r_2(\Omega_2/\Sigma\Omega_\lambda)$ of Judd-Ofelt parameters $\Omega_2$, $\Omega_4$ and $\Omega_6$ being equal to or greater than 0.75 and has a relative value $\Omega^r_4(\Omega_4/\Sigma\Omega_\lambda)$ being equal to or smaller than 0.25. The amorphous ceramic host is unexpectedly found to allow the lanthanide ions to exhibit the single-band upconversion of the infrared ray to visible ray.

In one embodiment of the third aspect, the upconversion luminescent material has an asymmetric and covalent bond-based microstructure. In one embodiment of the third aspect, the single-band upconversion luminescent material has a $^2H_{11/2} \rightarrow {}^4I_{15/2}$ transition possibility. In one embodiment of the third aspect, the upconversion luminescent material has a decay time smaller than or equal to 0.2 µs. In one embodiment of the third aspect, the amorphous ceramic host is a host containing $NaYF_4$ or $Y_2O_3$. In one embodiment of the third aspect, the lanthanide ions include $Er^{3+}$ or $Tm^{3+}$ ions. The single-band upconversion luminescent material of claim 10, wherein the amorphous phase stabilizer includes $SiO_2$ or $TiO_2$. In one embodiment of the third aspect, the single-band upconversion luminescent material exhibits upconversion emission to blue and green regions. In one embodiment of the third aspect, the lanthanide ions include $Er^{3+}$ ions, wherein the single-band upconversion luminescent material has a $^2H_{11/2} \rightarrow {}^4I_{15/2}$ transition possibility. In one embodiment of the third aspect, the lanthanide ions include $Tm^{3+}$ ions, wherein the single-band upconversion luminescent material has a $^1G_4 \rightarrow {}^3H_6$ transition possibility.

The present disclosure realizes the single-band upconversion and aids in the best performance in a variety of applications such as multiplexed molecular imaging, secure coding or non-linear optical devices.

The present disclosure realizes a high efficient single-band upconversion emission at 525 nm corresponding to $^2H_{11/2} \rightarrow {}^4I_{15/2}$ transition. This may enable minimal energy loss in the two photons based upconversion from a newly synthesized liquid-quenched amorphous matrix.

The present inventor found that the cause of the above phenomenon is the increased transition probability of host-sensitive transitions due to the covalent bond-based and asymmetric microstructure of the liquid-quenched amorphous matrix as is present as much as the melt phase amount.

Due to the increased transition probability, the ultra-fast decay time was shortened to 0.2 µs as the fastest record. The material according to the present disclosure may have a great potential for new applications that require high upconversion efficiencies and excellent fast response times that were previously unsatisfactory.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

Figure 1A:
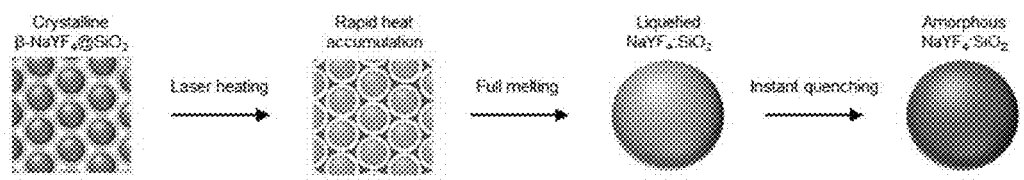
FIGS. 1A-1H show, as a single-band upconversion luminescent material, liquid-quenched amorphous $NaYF_4:SiO_2$ doped with both $Er^{3+}$ and $Yb^{3+}$.

For simplicity and clarity of illustration, elements in the figures. are not necessarily drawn to scale. The same reference numbers in different figures. denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

In one embodiment, the present disclosure provides a high-efficiency green single-band upconversion luminescence using lanthanide ions (e.g. $Er^{3+}$) embedded in a liquid-quenched amorphous matrix.

According to the Judd-Ofelt theory, the single-band upconversion is due to the well-known 'hypersensitive transition' caused by the increase in a probability of a transition of $^2H_{11/2} \rightarrow {^4I_{15/2}}$, that is, by the sharing and asymmetric environment of the liquid-quenched amorphous matrix.

The increase in the transition probability was confirmed from a fact that a decay time of the transition of $^2H_{11/2} \rightarrow {^4I_{15/2}}$ decreases from 171.9 μs to 0.2 μs. In particular, the present disclosure provides, for the first time, a single-band upconversion without an aid of the non-radiative energy transfer, which is proven by the transition probability change. In this connection, the present disclosure provides an ultra-fast extinction time of smaller than 1 microsecond, which are never reported in previous literatures.

Further, the present inventor demonstrated, via a study of the liquid-quenched amorphous matrix of $Y_2O_3$, that the same single-band upconversion as mentioned above occurs regardless of the host matrix composition.

Further, in order to identify the upconversion path for the single-band emission, the power dependence and temporal behavior of all spectral peaks in the visible range were thoroughly investigated.

Finally, a mechanism proposed for obtaining a single-band spectrum in a liquid-quenched amorphous matrix was verified by applying the mechanism to alternative dopants ($Tm^{3+}$ and $Ho^{3+}$).

Single-Band Upconversion of $Er^{3+}$ in Liquid-Quenched Amorphous Matrix

Figure 1B:
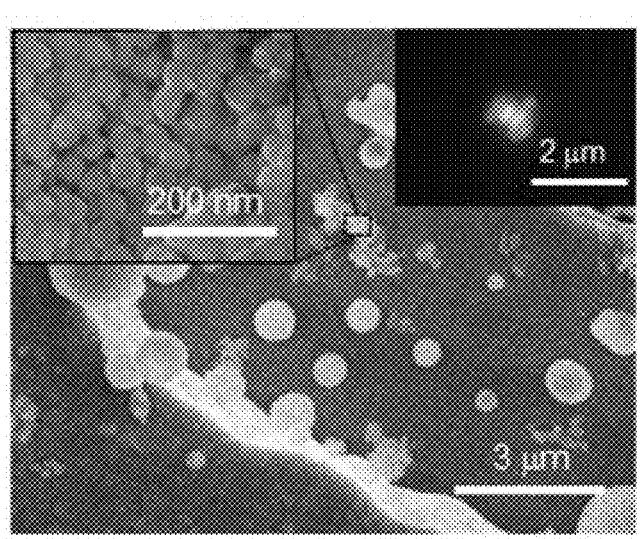
Figure 1C:
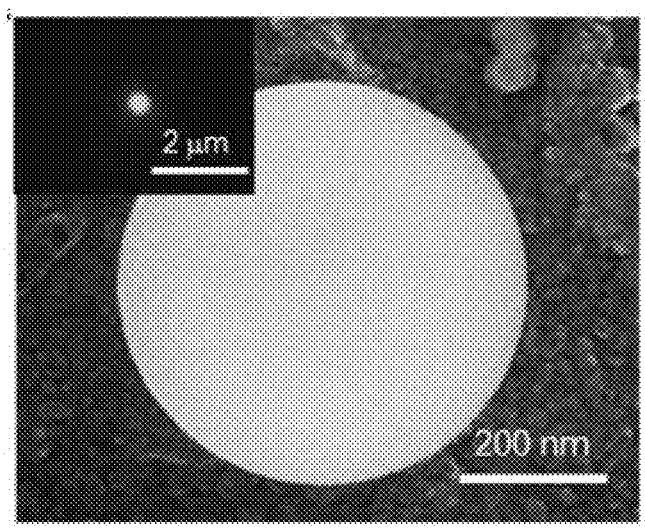
Figure 1D:
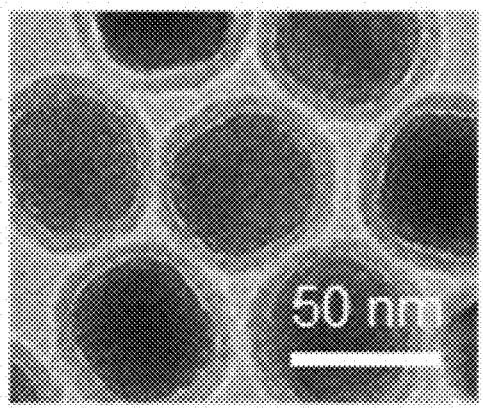
Figure 1E:
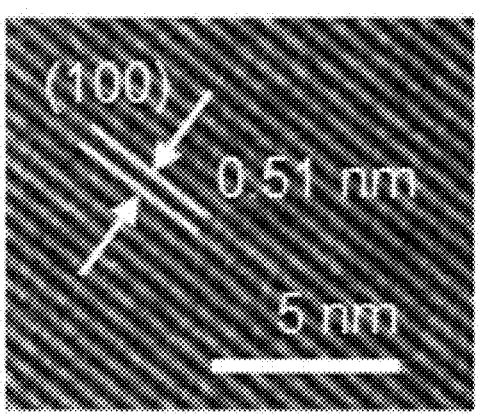
Figure 1F:
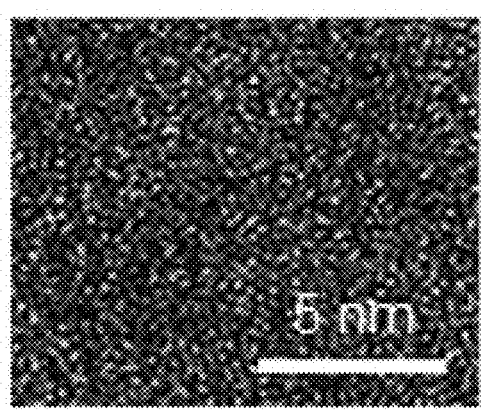
Figure 1G:
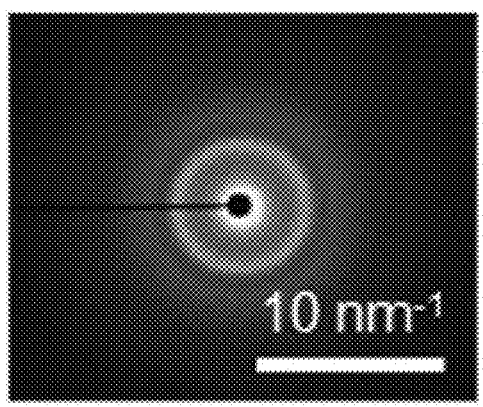
Figure 1H:
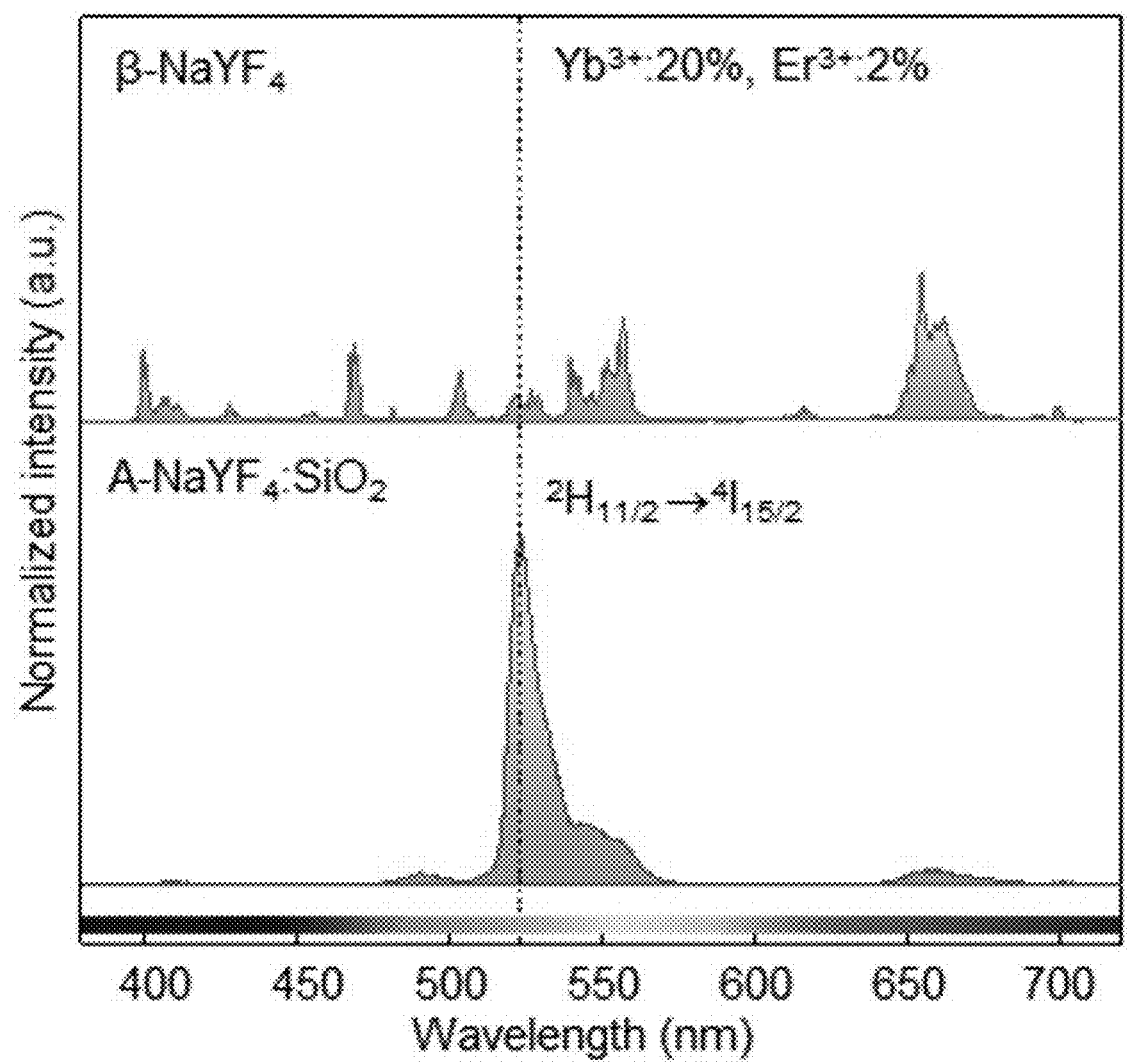

FIGS. 1A-1H show, as a single-band upconversion luminescent material, liquid-quenched amorphous $NaYF_4$:SiO2 doped with both $Er^{3+}$ and $Yb^{3+}$. FIG. 1A is a schematic diagram of a process for synthesizing the liquid-quenched amorphous $NaYF_4$:$SiO_2$ (A-$NaYF_4$:$SiO_2$) by irradiation of laser to a β-$NaYF_4$ nanocrystal coated with a thin $SiO_2$ layer. FIG. 1B is an image of a crumb of the β-$NaYF_4$ nanocrystal on a substrate. In FIG. 1B, a upper left inset refers to a high resolution image, while a upper right inset refers to an image of the upconversion emission from the β-$NaYF_4$ nanocrystal. FIG. 1C is an image of synthesized A-$NaYF_4$:$SiO_2$. In FIG. 1C, an inset refers to an image of a single-band upconversion emission. FIG. 1D is a TEM image of an about 45 nm diameter-based β-$NaYF_4$ nanocrystal particles coated with about 8 nm thick $SiO_2$ layer. FIG. 1E is a TEM image of a corresponding lattice structure. FIG. 1F is a TEM cross-sectional view of A-$NaYF_4$:$SiO_2$. FIG. 1G is a halo-like SAED (Selected Area Electron Diffraction) pattern thereof. FIG. 1H shows a single-band upconversion emission spectrum from A-$NaYF_4$:$SiO_2$ (20%, 2%) under irradiation of 980 nm CW laser at $3 \times 10^6$ $W/cm^2$, compared with the multiband upconversion from 1-$NaYF_4$.

Figure 5:
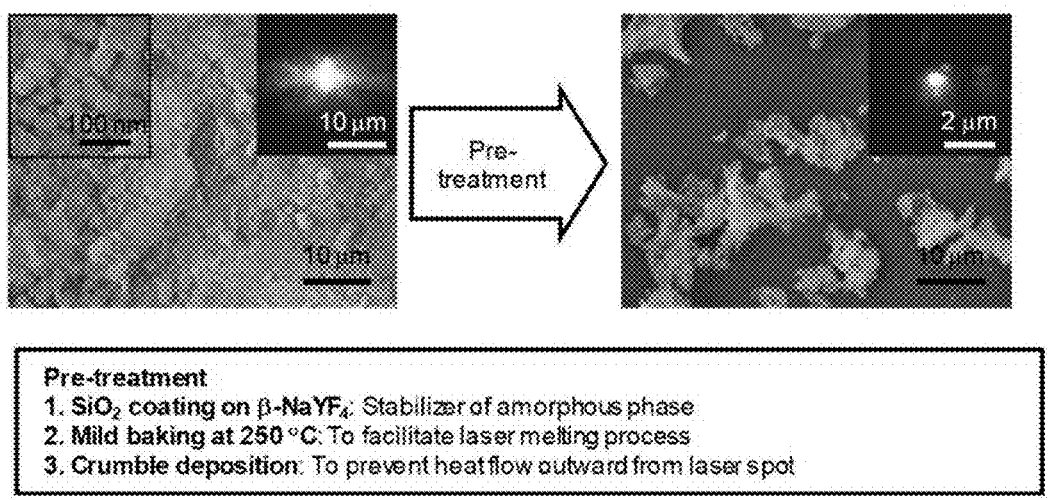
FIG. 5 shows a full melting and instant quenching process using laser.
Figure 5:
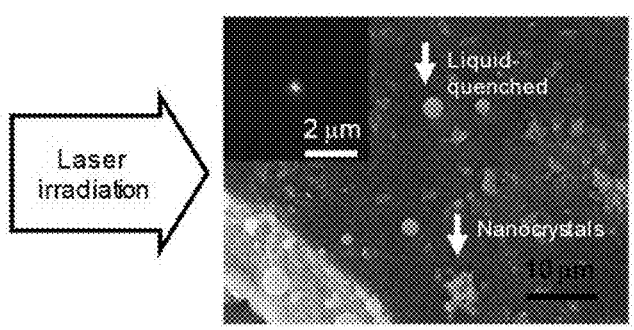

As stated in the Lindemann criterion, nanocrystals exhibit a lower melting temperature than their corresponding bulk state by promoting surface liquefaction. Furthermore, the large surface area of the nanocrystals accommodates an effective barrier that prevents heat diffusion by confining phonon propagation at the surface, resulting in rapid heat accumulation. Given such unique thermal properties of nanocrystals, we found that upconversion nanocrystals could be melted by the heat generated by the non-radiative relaxation during the upconversion process under brief irradiation with a 980 nm continuous-wave (CW) laser. Upon melting, the liquefied upconversion nanocrystals are monolithically integrated and immediately quenched because of the extinction of the nanocrystals' surface effects. This liquid-quenching process is effectively performed when the upconversion nanocrystals are deposited onto a substrate in the form of crumbs smaller than a few micrometers in diameter, comparable to the size of the focused laser spot of approximately 2 μm×4 μm (see FIG. 5).

Figure 6:
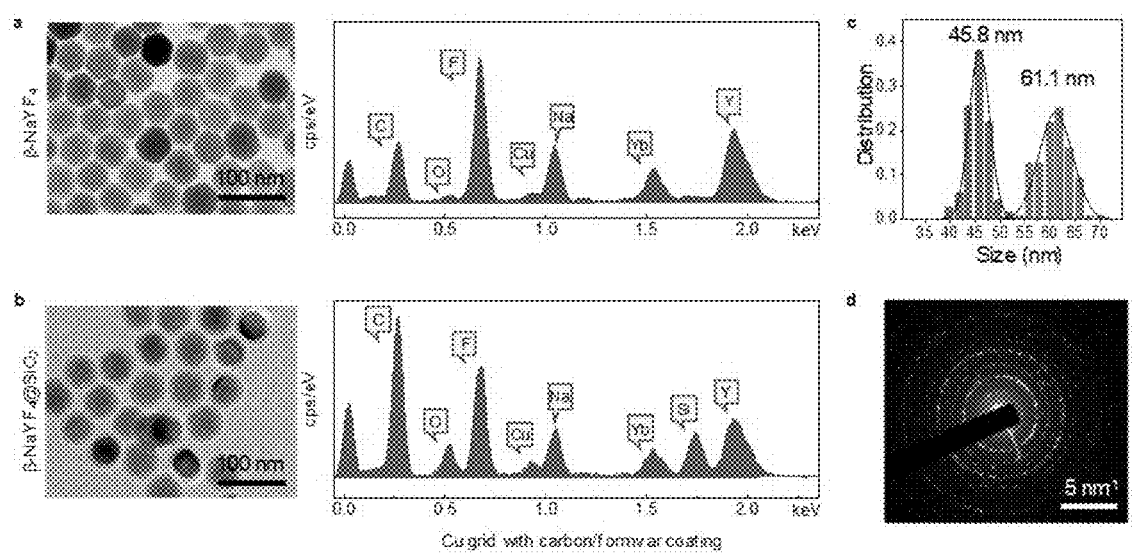
FIG. 6 shows an application of an amorphous phase stabilizer (thin film of $SiO_2$ coated on $β-NaYF_4$).

The liquid-quenched amorphous matrix (named A-$NaYF_4$:$SiO_2$) of $NaYF_4$ was produced by full melting and following instant quenching of hexagonal β-$NaYF_4$ nanocrystals coated with a $SiO_2$ layer under focused laser irradiation (see FIG. 1A). The β-$NaYF_4$ nanocrystals were coated with a thin layer of $SiO_2$ as an amorphous phase stabilizer to inhibit recrystallization of the liquefied matrix (FIG. 6). This is because the microcrystals of liquid-quenched $NaYF_4$ without the $SiO_2$ layer were found to be semi-crystalline due to spontaneous recrystallization during the quenching process, and, thus, the semi-crystalline property may cause an immature change in the upconversion spectrum. FIG. 6 is referenced.

FIG. 6 shows an application of an amorphous phase stabilizer (thin film of $SiO_2$ coated on β-$NaYF_4$). FIG. 6a illustrates a TEM-EDS analysis of β-NaYF4, FIG. 6b shows β-$NaYF_4$ @$SiO_2$ nanocrystals. A thin film of $SiO_2$ of about 8 nm thickness was introduced. This was confirmed via TEM observation and EDS analysis. An average size of the synthesized nanocrystals was 45.8 nm and the thickness of the $SiO_2$ layer was about 8 nm. FIG. 6d shows the SAED of β-$NaYF_4$. A sharp ring type diffraction pattern was observed because the nanocrystals exhibit a diffraction pattern similar to a polycrystalline material.

Figure 7A:
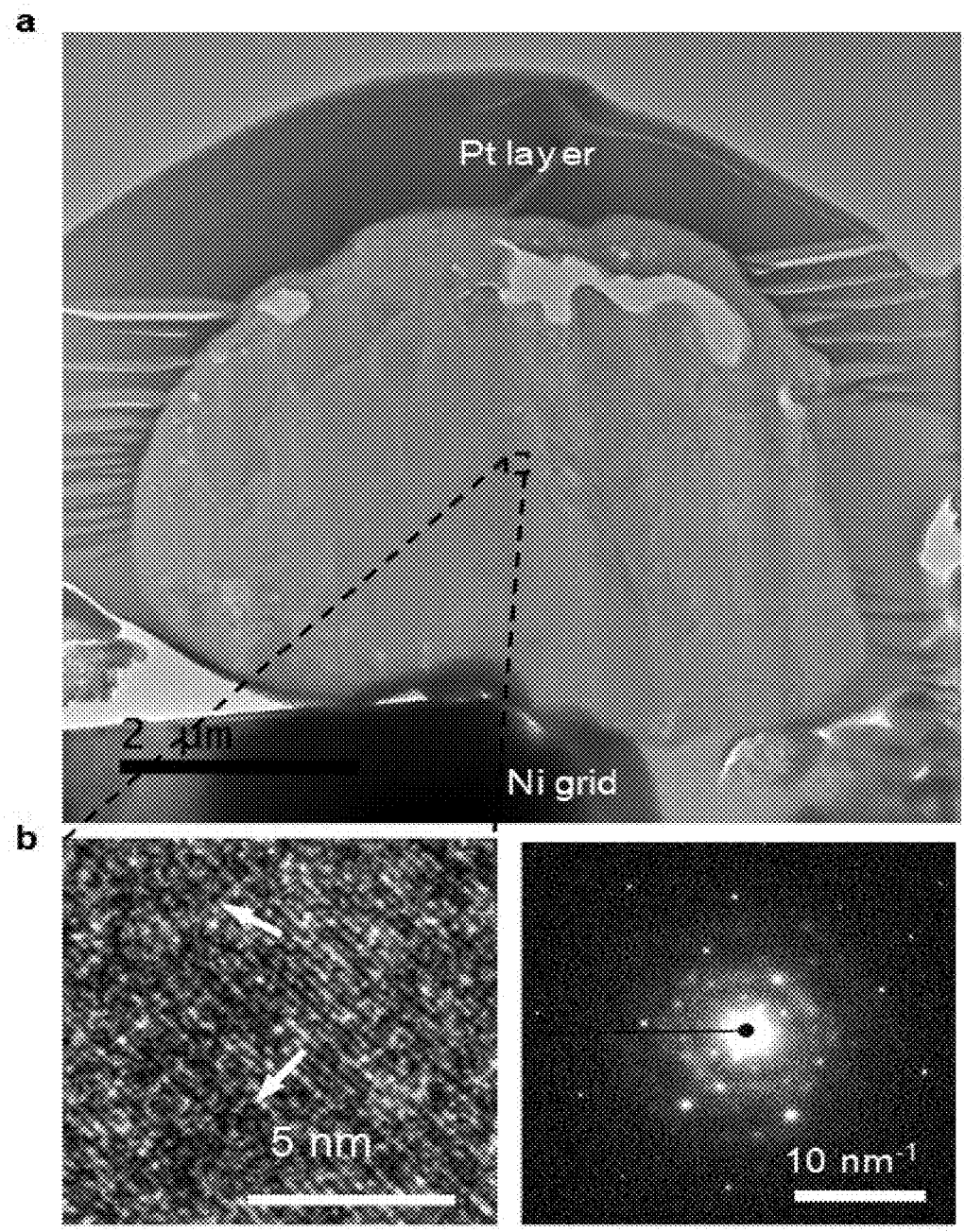
FIGS. 7A-7C show a host material semi-crystalized in a liquid-quenching without a $SiO_2$ phase stabilizer.
Figure 7B:
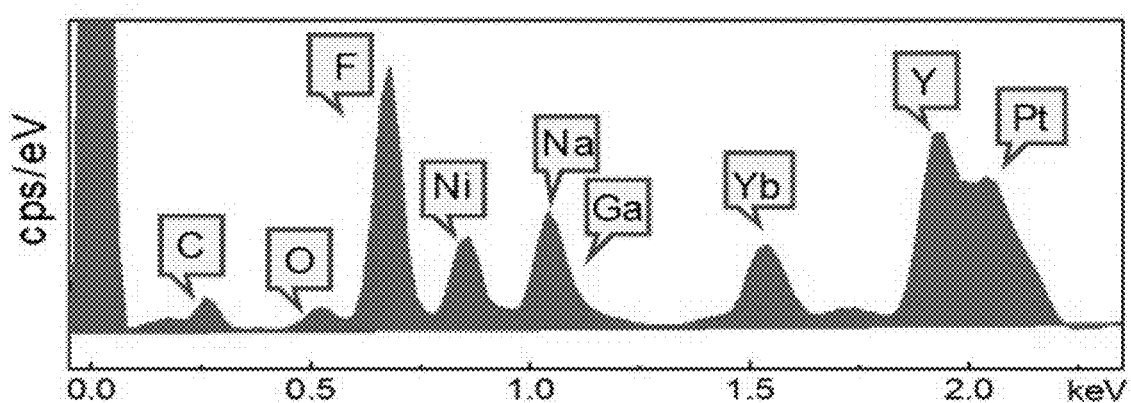
Figure 7C:
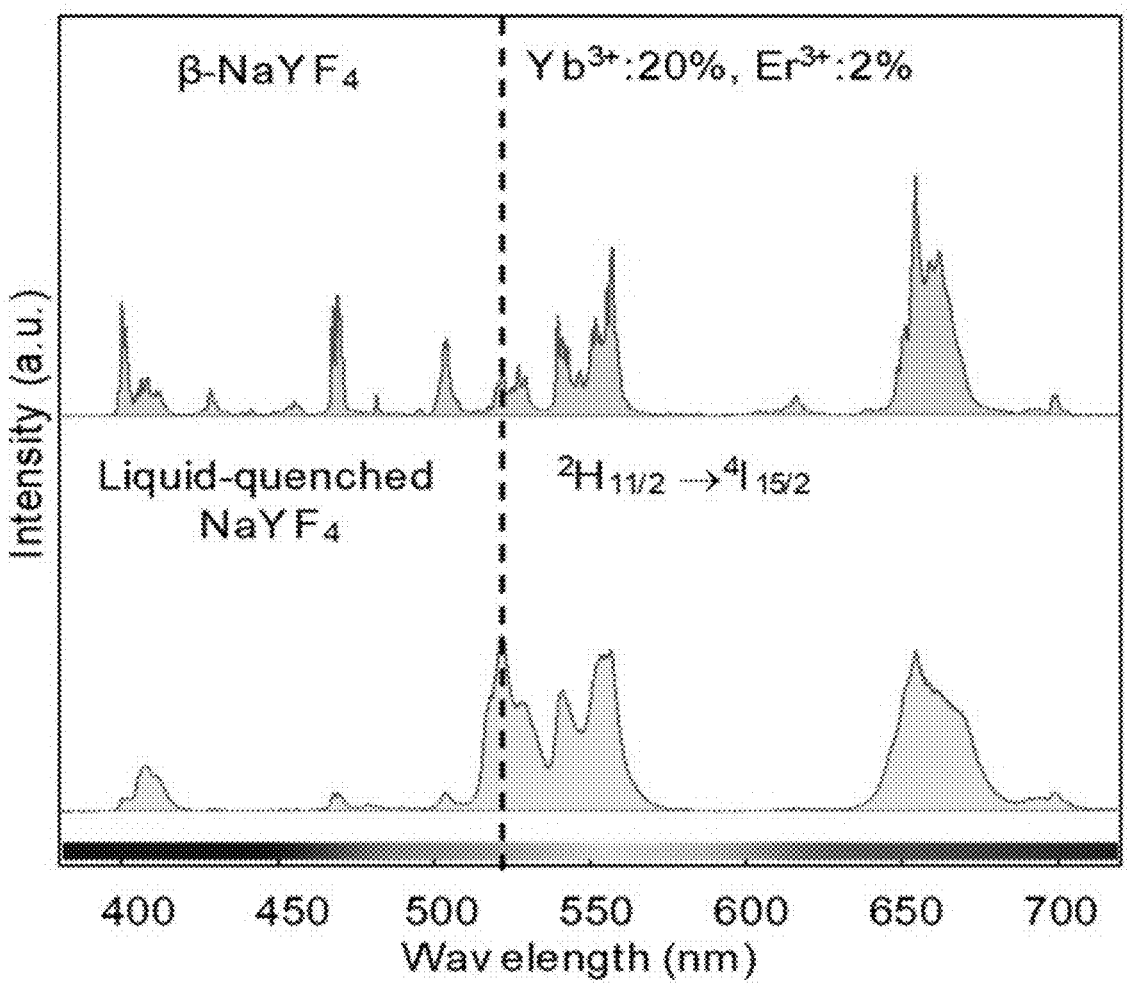

FIGS. 7A-7C show a liquid-quenched host material without a $SiO_2$ phase stabilizer. FIG. 7A and FIG. 7B showresults of a cross-section analysis of $SiO_2$-free β-$NaYF_4$ after $SiO_2$-free (β-$NaYF_4$ is subjected to laser-induced liquid-quenching. In an absence of the amorphous phase stabilizer $SiO_2$, the quenched matrix was semi-crystalline due to spontaneous recrystallization (refer to a left photograph of FIG. 7B; a white arrow points to an amorphous region). This is confirmed by the SAED pattern (refer to a right picture of FIG. 7B). FIG. 7C shows that the chemical composition of the liquid-quenched $NaYF_4$ did not change from the initial β-$NaYF_4$ chemical composition during the liquid-quenching process (which may be compared with FIG. 6). This is confirmed by TEM-EDS analysis (Ni, Ga and Pt are introduced during the sample production process). FIG. 7D illustrates an insufficient change in the upconversion spectrum in the liquid-quenched $NaYF_4$. Notably, due to the amorphous region, the $^2H_{11/2} \rightarrow ^4I_{15/2}$ transition of the liquid-quenched $NaYF_4$ was significantly increased compared to that of (3-$NaYF_4$ untreated with the liquid-quenching.

The incorporation of $SiO_2$ into the liquid quenched matrix of $NaYF_4$ produces a non-glass state and amorphous structure that exhibited a strong change in a short-range structure (i.e., first coordination) due to the instant quenching. The chemical composition of A-$NaYF_4$:$SiO_2$ was confirmed to be homogeneous by TEM-EDS analysis. A size of the liquid-quenched sample was mainly determined by a size of a debris of the deposited upconversion nanocrystals, whose diameter was in a range of from submicron to several μm (FIG. 1B). The liquid-quenched matrix was generally spherically integrated to minimize the surface energy (FIG. 1C). After the liquid quenching process, the crystalline β-$NaYF_4$ nanocrystals (FIG. 1D, FIG. 1E) coated with the about 8 nm $SiO_2$ thin film were transformed into an amorphous matrix as identified by TEM images and a halo-like SAED pattern (FIG. 1F, FIG. 1G).

Figure 10A:
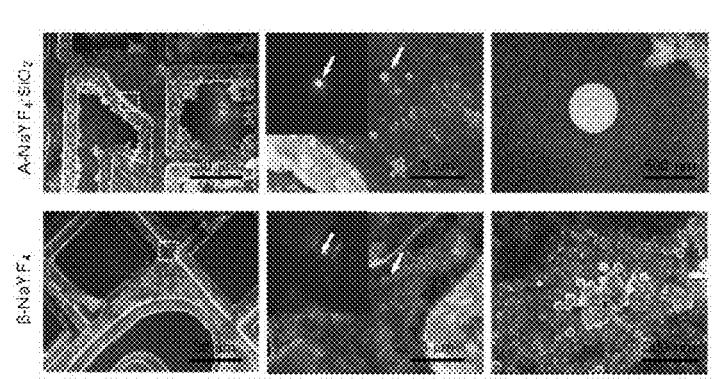
FIGS. 10A-10C illustrate a standardized integrated intensity in an entire visible range (400 to 700 nm) and over three colors (blue, green and red: 400 to 500, 500 to 600, and 600 to 700 nm, respectively).
Figure 10B:
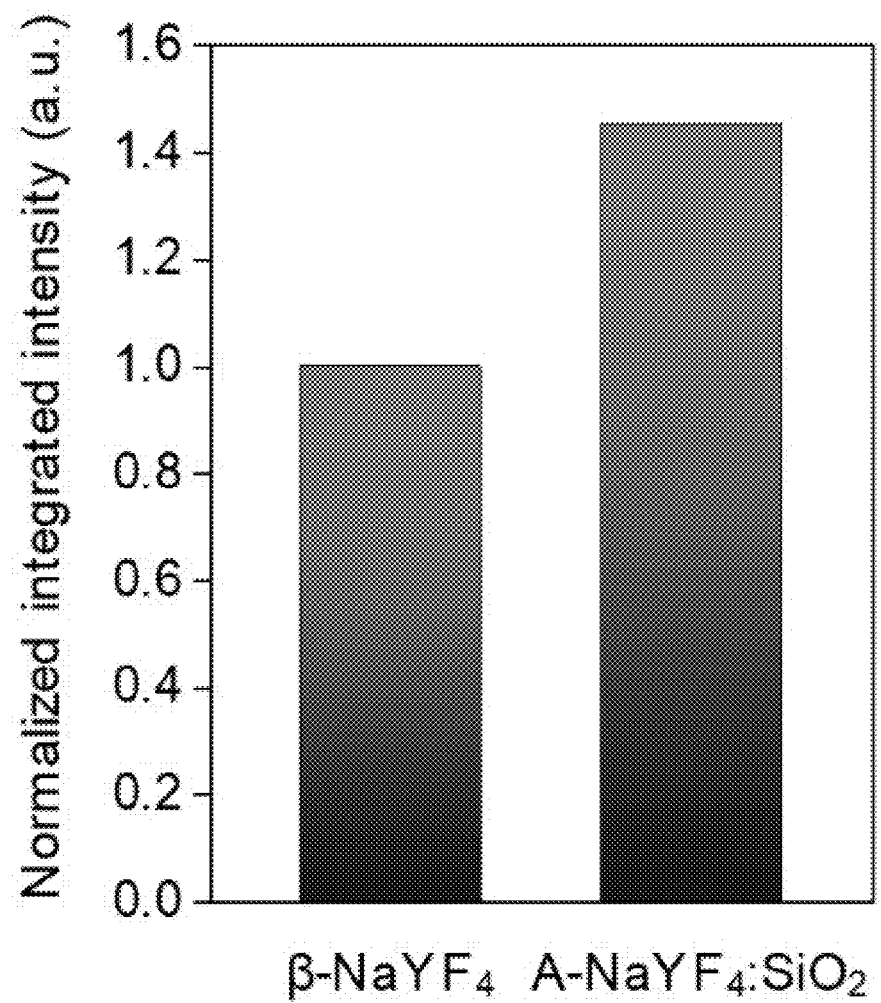
Figure 10C:
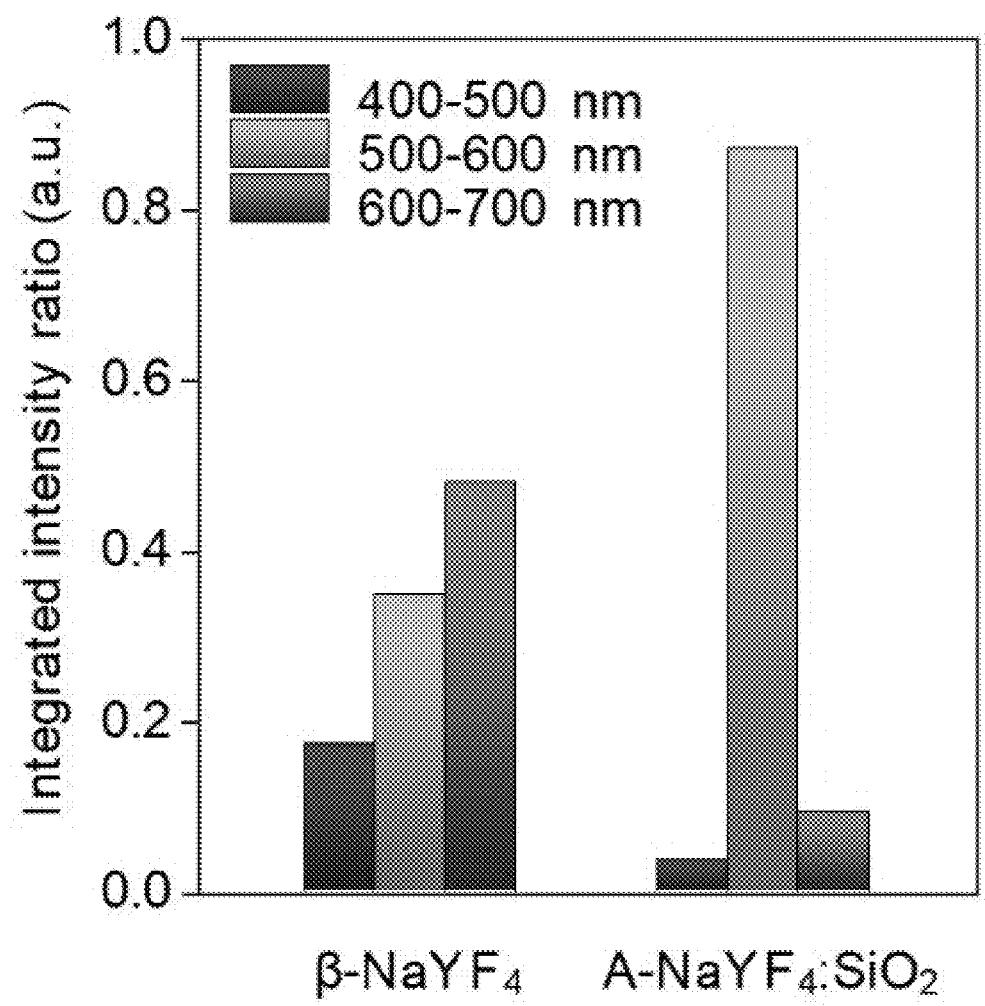
Figure 11A:
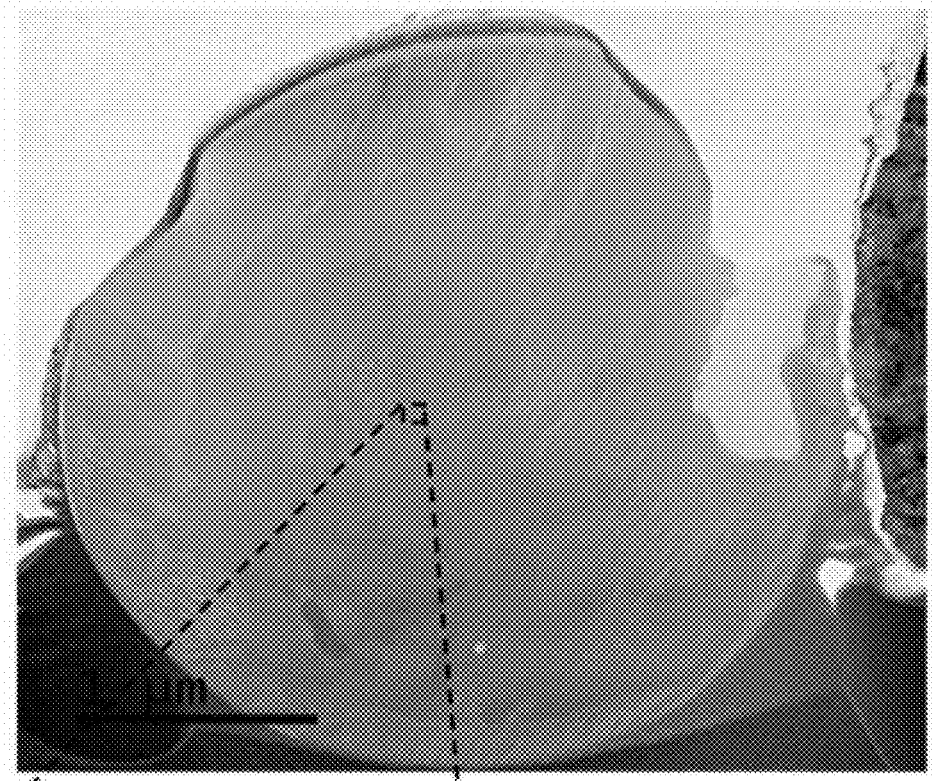
FIGS. 11A-11D show liquid-quenched amorphous $Y_2O_3$:$SiO_2$.
Figure 11A:
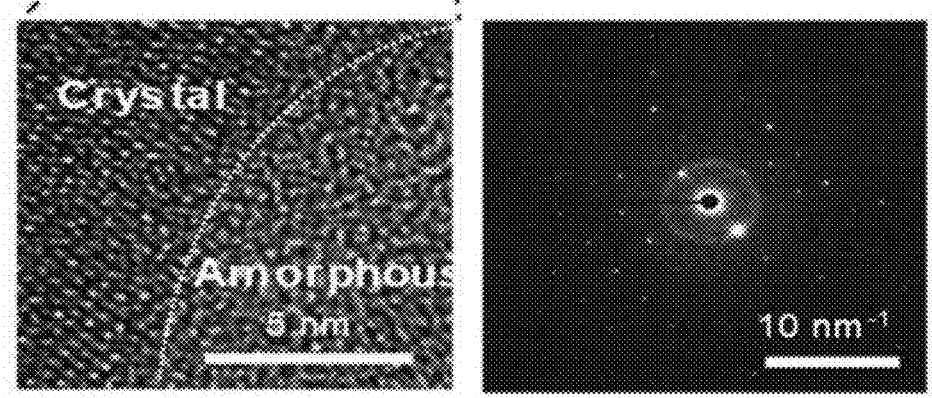
Figure 11B:
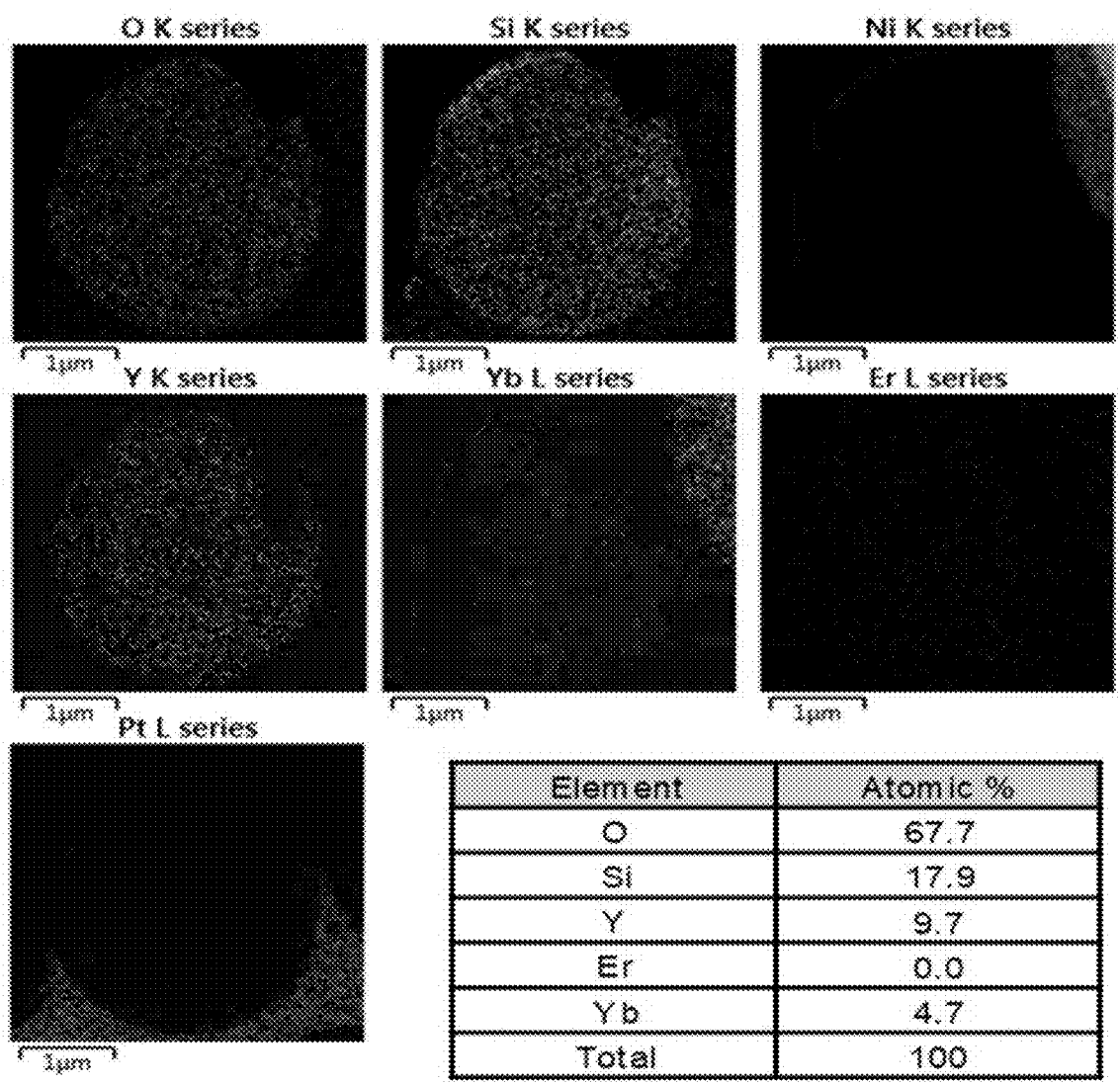
Figure 11C:
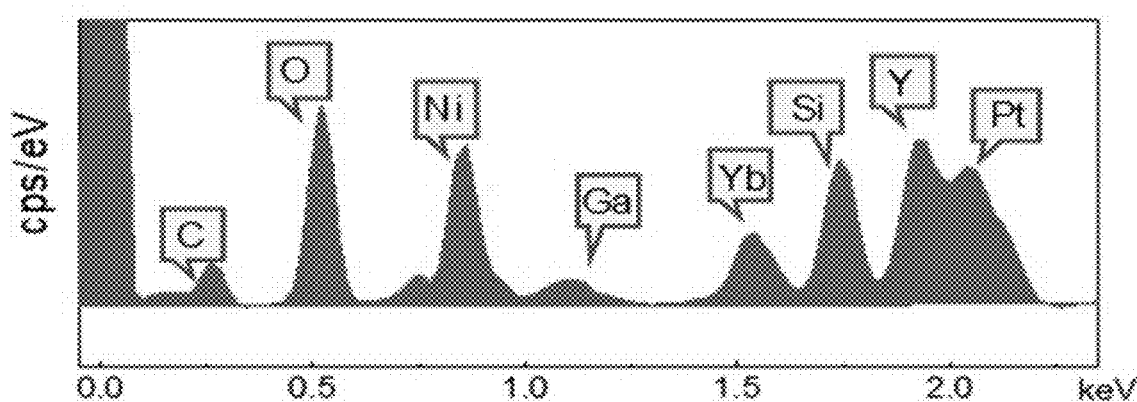
Figure 11D:
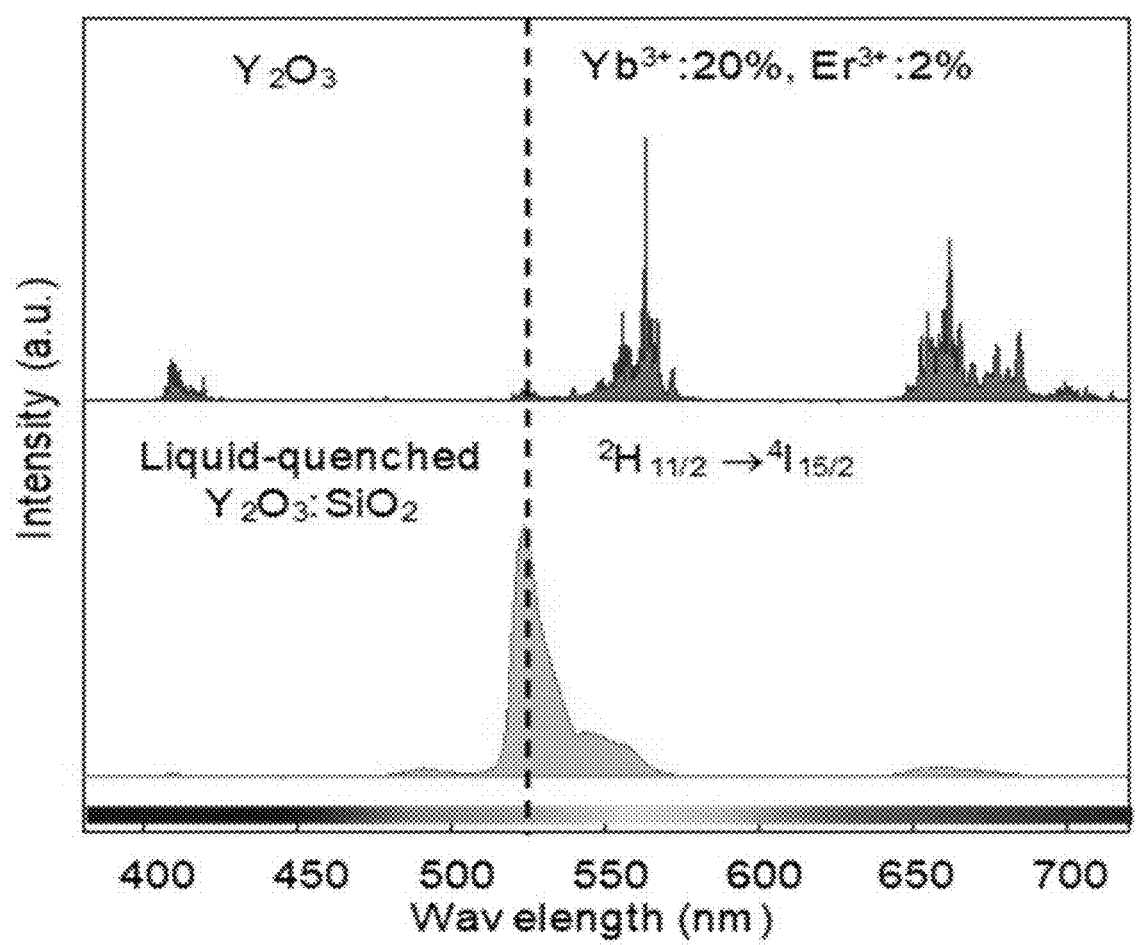

When using a 980 nm pump laser at $3 \times 10^6$ $W/cm^2$, β-$NaYF_4$:$Yb^{3+}$, $Er^{3+}$ (20%, 2%) nanocrystals show typical multi-band upconversion spectra, whereas, A-NaYF4: $SiO_2$, $Yb^{3+}$, $Er^{3+}$ (20%, 2%) nanocrystals show intense green single-band upconversion emission (FIG. 1H). The upconversion emission intensity of A-$NaYF_4$:$SiO_2$ over the entire visible range was higher by about 45% than that of the β-$NaYF_4$ when standardized based on a volume thereof. Most upconversion emissions appeared at the $^2H_{11/2} \rightarrow ^4I_{15/2}$ transition (corresponding to about 525 nm). About 87% of the upconversion spectrum concentrated on the green band (500 to 600 nm) (FIGS. 10A-10C). In comparison with a yellow green upconversion emission from the β-$NaYF_4$, a clear-green color upconversion emission from the A-$NaYF_4$:$SiO_2$ was observed under the laser irradiation of equivalent power density (See insets in FIG. 1B and FIG. 1C).

A possibility of a new intermediate energy level due to the $SiO_2$ component in the electronic transition is simply excluded because of the large band gap energy of about 9 eV. Further, we confirmed that the liquid-quenched semi-crystalline $NaYF_4$ exhibited a large increase in $^2H_{11/2} \rightarrow {}^4I_{15/2}$ emission in an absence of $SiO_2$ (FIGS. 7A-7C). Therefore, a large spectral change from the multi-bands to a single-band in the upconversion nanocrystal is largely due to the microstructure change from a crystal state to an amorphous state of the host matrix.

The present inventor further studied $Y_2O_3:SiO_2$ as an alternative host matrix. After the liquid quenching process, an equivalent green single-band upconversion emission was also seen in the liquid-quenched $Y_2O_3:SiO_2$ (see FIGS. 11A-11D). This means that the single-band upconversion is due to the structural form of the liquid-quenched amorphous matrix, not to the composition of the host material.

Figure 8:
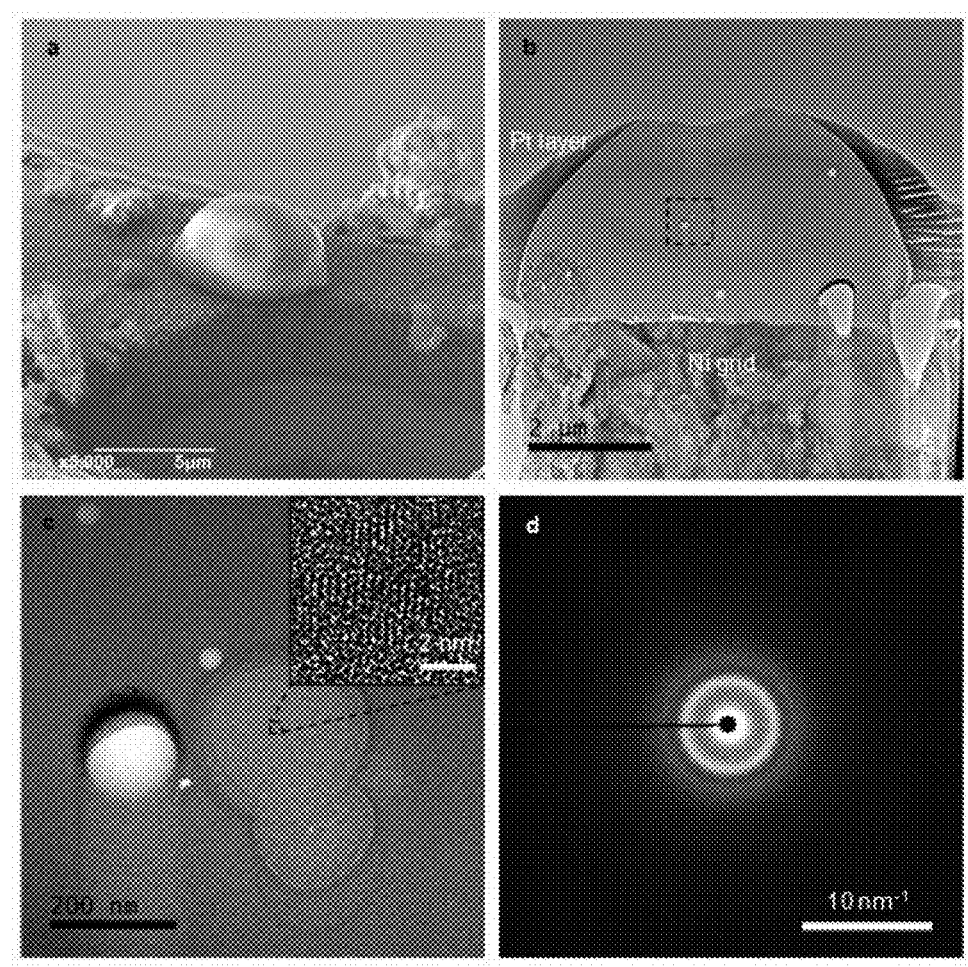
FIG. 8 shows a cross-sectional analysis of liquid-quenched amorphous $NaYF_4:SiO_2$ ($A-NaYF_4:SiO_2$).

FIG. 8 shows a cross-section of liquid-quenched amorphous $NaYF_4:SiO_2$ (A-$NaYF_4:SiO_2$). FIG. 8a is a SEM image of a synthesized A-$NaYF_4:SiO_2$. FIG. 8b is a cross section view thereof. In this connection, a thin film having a cross section was prepared by a focused ion beam (FIB) for HRTEM analysis. As shown in FIG. 8c, when focusing the electron beam (200 kV) on the thin film, the amorphous region was partially crystallized (refer to inset). Generally, when heated or irradiated by an electron beam, a non-glass state and amorphous structures undergo recrystallization, while vitreous amorphous structures undergo glass transition or melting. As shown in FIG. 8d, this matrix has a typical halo-like SAED pattern of an amorphous structure.

Figure 9A:
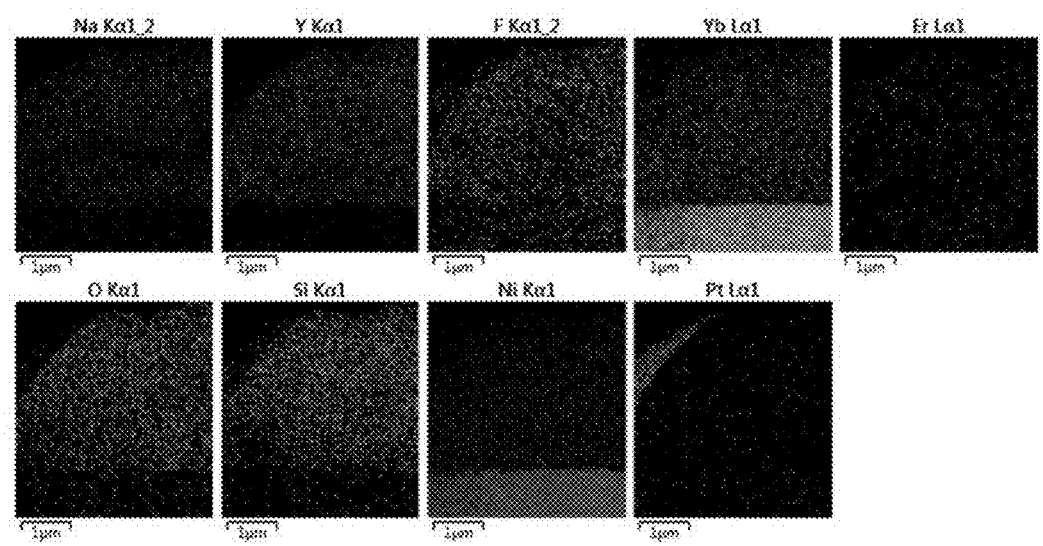
FIGS. 9A and 9B illustrate a chemical homogeneity of a liquid-quenched amorphous matrix.
Figure 9B:
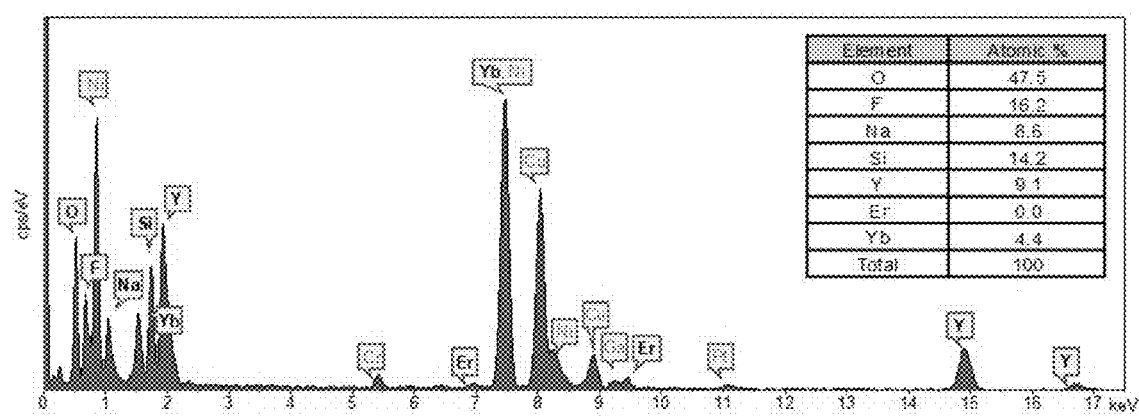

FIGS. 9A and 9B show a chemical homogeneity of a liquid-quenched amorphous matrix. FIG. 9A is a TEM-EDS mapping image of synthesized A-$NaYF_4:SiO_2$, $Yb^{3+}$, $Er^{3+}$ (20%, 2%). This chemical homogeneity was maintained during the liquid-quenched process. FIG. 9B is the EDS spectrum of the mapping area and the calculated composition thereof. The analysis is quasi-quantitative. Thus, only a rough composition could be obtained in the analyte. The peak intensities of these elements were almost unchanged from those in the initial state (β-$NaYF_4:Yb^{3+}$, $Er^{3+}$ (20%, 2%)). The contents of Si and O were obtained from the $SiO_2$ coating layer during the liquid-quenched process.

FIGS. 10A-10C the standardized integrated intensities in the entire visible range (400 to 700 nm) and over three colors (blue, green and red: 400 to 500, 500 to 600, and 600 to 700 nm, respectively). The integrated intensity of each sample was collected using an optical microscope. A volume-based normalization of the integrated intensity was performed by correlating a SEM image with the sample observed in the optical microscope using a TEM finder grid. This liquid-quenched amorphous matrix sample was estimated to be perfectly spherical. This incorporated $SiO_2$ volume was excluded from the calculation for a fair comparison. The total volume of the crystalline sample was calculated using about 80 nanocrystals of 45 nm diameter. The surface quenching effect of the nanocrystals was compensated for by applying an 'ideal volume-to-size factor (×1.25 for a 45 nm nanocrystal)'.

FIGS. 11A-11D show the liquid-quenched amorphous $Y_2O_3:SiO_2$. The liquid-quenched $Y_2O_3:SiO_2$ was largely separated into two phases. The crystalline and amorphous regions were confirmed by a HRTEM image (left image of b in FIG. 11A) and a SAED pattern (right image of b in FIG. 11A). The crystalline region may be interpreted as being formed during instant quenching due to the fact that the crystalline region has the chemical composition ratio of $Y_2Si_xO_{3+2x}$. The EDS mapping analysis confirmed that the crystalline and amorphous phases have homogeneity in the composition (see FIG. 11C). The chemical composition may be confirmed from the EDS analysis (see FIG. 11D). In FIG. 11E, the liquid-quenched microstructure of $Y_2O_3:SiO_2$ showed a strong green single-band spectrum similar to that of A-$NaYF_4:SiO_2$, even though it was a mixture of crystalline and amorphous regions.

Judd-Ofelt Analysis of Liquid-Quenched Amorphous Matrix

According to Judd-Ofelt (JO) theory, the spectral intensity and ratio of the 4f-4f transition are mainly dependent on the host-dependent JO parameter ($\Omega_\lambda$=2,4,6) and the host-independent matrix element ($U_\lambda$=2,4,6). Therefore, the absorption and emission spectrum, radiation lifetime, energy transfer probability and quantum efficiency of $Ln^{3+}$ contained in the host matrix are easily predicted using the JO parameters. In particular, in accordance with the present disclosure, the relative JO parameters ($\Omega^r_{\lambda=2,4,6}$, $\Sigma\Omega^r_\lambda$=1) of $Er^{3+}$ contained in A-$NaYF_4:SiO_2$ were investigated using only the upconversion spectrum. This is because the diameter of the obtained sample is smaller than a few micrometers, and, in this size range, it was not possible to measure other characteristics such as absorption spectra or excitation spectra required for absolute JO parameter calculations. Nevertheless, the relative values of the JO parameters may give important information to understand the cause of the single-band upconversion emission in the liquid-quenched amorphous matrix.

Figure 2A:
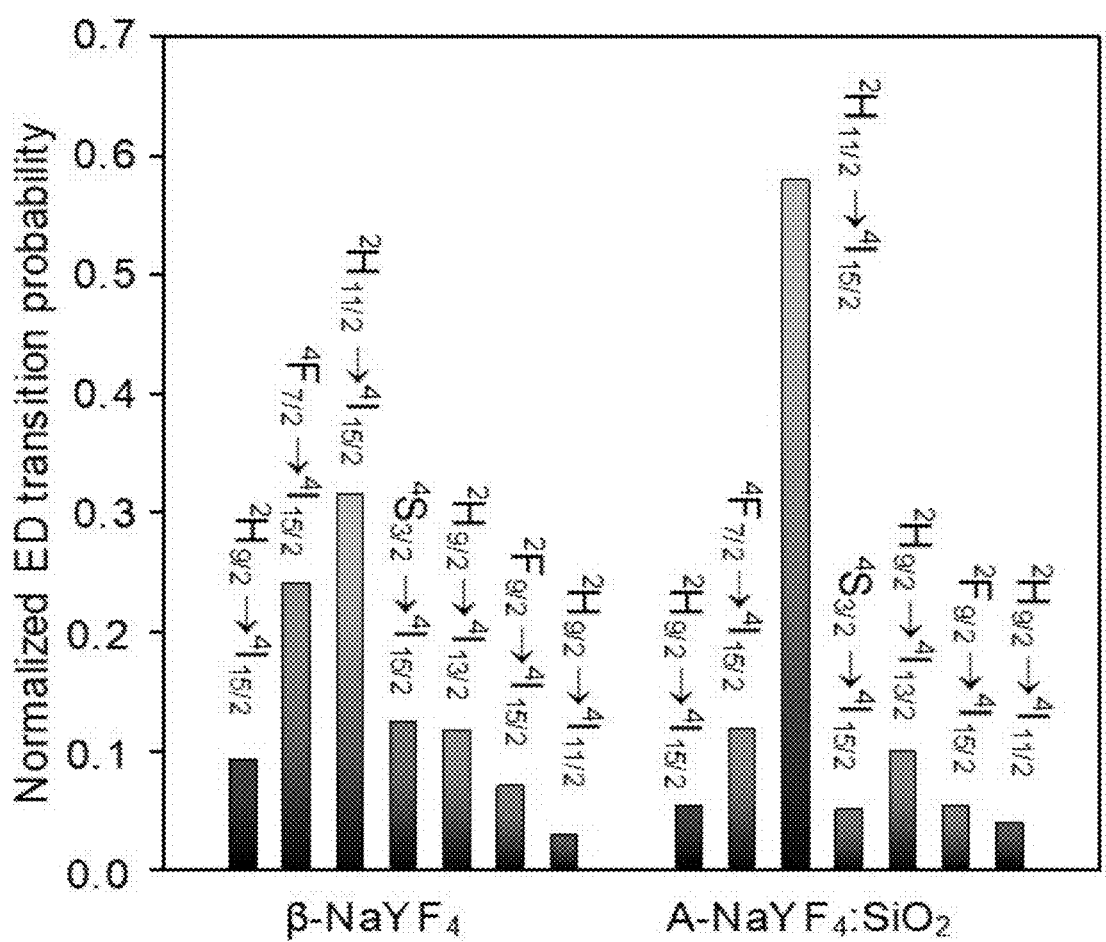
FIGS. 2A-2C show a Judd-Ofelt analysis of a liquid-quenched amorphous matrix.

The electric dipole transition probability ($A_{ED}$) of the $Er^{3+}$ transition in the visible light region ($^2H_{9/2} \rightarrow {}^4I_{15/2}$, $^4I_{13/2}$, $^4I_{11/2}$, $^4F_{7/2} \rightarrow {}^4I_{15/2}$, $^2H_{11/2} \rightarrow {}^4I_{15/2}$, $^4S_{3/2} \rightarrow {}^4I_{15/2}$, $^2F_{9/2} \rightarrow {}^4I_{15/2}$) were calculated (FIG. 2A).

Figure 2B:
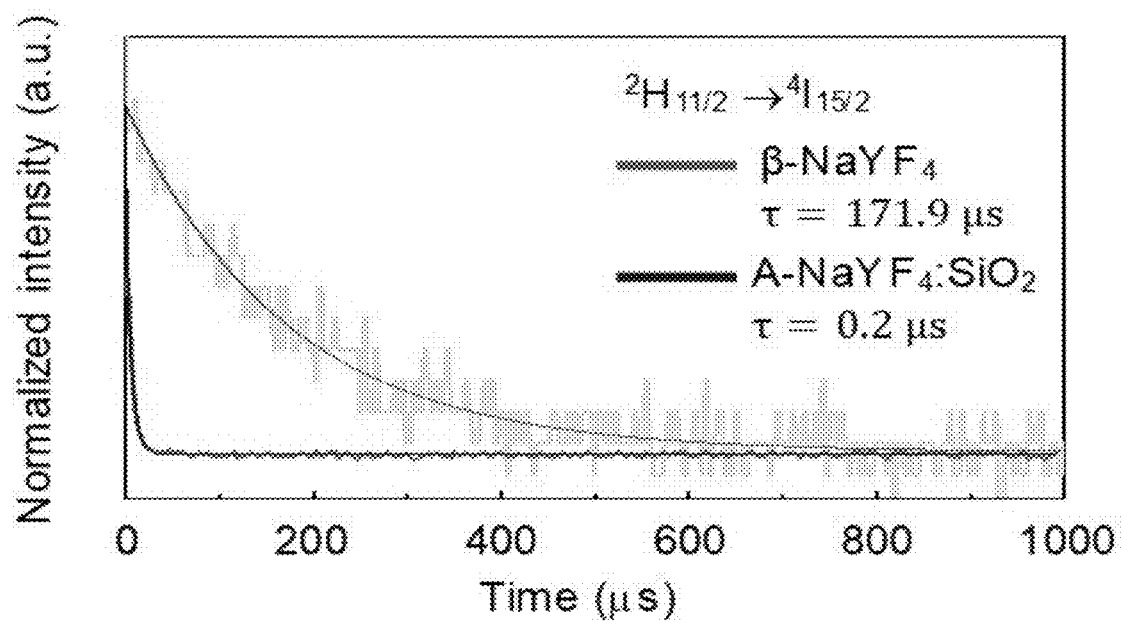
Figure 2C:
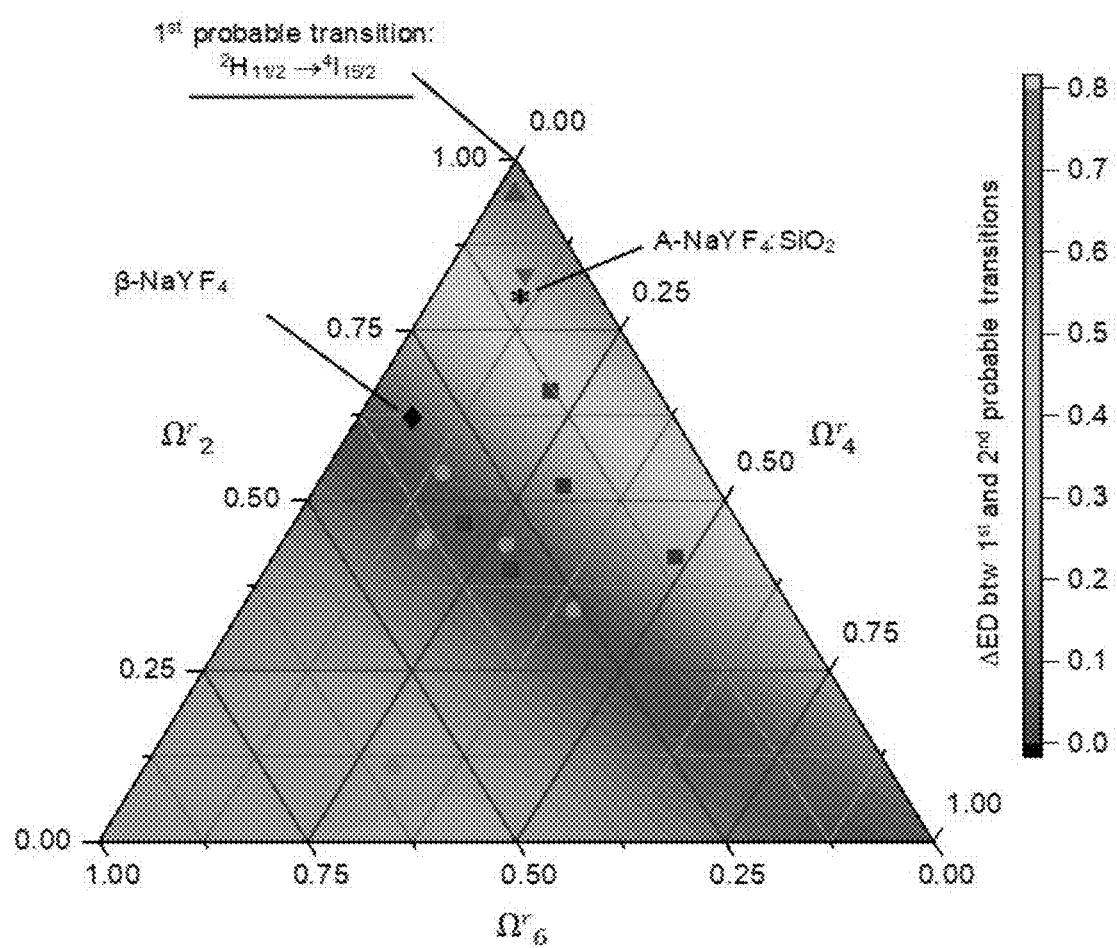

In FIGS. 2A-2C, FIG. 2A shows the standard electric dipole (ED) transition probability of $Er^{3+}$-embedded (β-$NaYF_4$ and A-$NaYF_4:SiO_2$. FIG. 2B shows the decay curve of $^2H_{11/2} \rightarrow {}^4I_{15/2}$ transition. FIG. 2C illustrates a 3-phase diagram of the standardized electric dipole transition probability difference (ΔED) between the first and second probability transitions of $Er^{3+}$ as plotted by the relative values of the JO parameters ($\Omega^r_{\lambda=2,4,6}$, $\Sigma\Omega^r\lambda$=1). The marked points correspond to the relative JO parameters of the $Er^{3+}$ ions embedded in the various host matrices.

The β-$NaYF_4$ showed the highest $A_{ED}$ of $^2H_{11/2} \rightarrow {}^4I_{15/2}$ transition. However, the upconversion spectrum of β-$NaYF_4$ has an apparent multiband emission with a relatively small intensity of $^2H_{11/2} \rightarrow {}^4I_{15/2}$ transition. This is because non-radiative energy transfer, which includes crossover relaxation, energy back transfer and multi-phonon relaxation provides a secondary pathway to other radiation-energy levels to still contribute to the upconversion spectrum. In contrast, in case of A-$NaYF_4:SiO_2$, the $A_{ED}$ difference between $^2H_{11/2}$-*$^4I_{15/2}$ transition and other transitions is much greater than that in the β-$NaYF_4$, leading to a green single-band emission spectrum. In A-$NaYF_4:SiO_2$, the remarkably high $A_{ED}$ ratio of the $^2H_{11/2} \rightarrow {}^4I_{15/2}$ transition supports the observed ultra-fast radiation decay time (β-$_{NaYF4}$:171.9 μs) of 0.2 μs (FIG. 2B). This is because the lifetime of the excited state is inversely proportional to the transition probability. The decay times (4 to 7 μs) of the other transitions in the A-$NaYF_4:SiO_2$ are much shorter than those of the transitions (10 to 380 μs) in β-$NaYF_4$, $Yb^{3+}$, and $Er^{3+}$. However, transitions in the A-$NaYF_4:SiO_2$, the ultra-fast decay time was observed only in the $^2H_{11/2} \rightarrow {}^4I_{15/2}$ transition. As a result, the ultra-fast radiation from the $^2H_{11/2}$ state can effectively exclude the secondary energy transfer by causing a monopoly of the photon consumption. The single-band emission generated from the $^2H_{11/2} \rightarrow {}^4I_{15/2}$ transition of $Er^{3+}$ is attractive. This is because the $^2H_{11/2}$ state is excited with a smaller energy loss via minimal non-radiative relaxation in an efficient two-photon upconversion path.

For further comprehension, a three-phase diagram of the electrical dipole transition probability difference (ED) between the first and second possible transitions is plotted using the relative value of the JO parameter in FIG. 2C. The ΔED value was normalized by the sum of all the transition probabilities for a reasonable comparison. The present inventor converts A-NaYF$_4$:SiO$_2$, β-NaYF$_4$ and the other host materials as reported in the literatures into relative JO parameters which are expressed as a three-phase diagram. In the three-phase diagram, a sharp increase in ΔED may be found under the condition of $Ω^r{}_2$>0.75. This is because the $Ω_2$ parameter increases based on the covalent bond as the chemical bond and the asymmetrical crystal field of the host ions, thus indicating the disorder of the matrix. In interpretation with consideration of this, the present inventor confirmed that the liquid-quenched amorphous matrix causes an extremely chaotic environment, which allows the embedded Er$^{3+}$ to have the transition probability of the $^2H_{11/2}$→$^4I_{15/2}$ transition, which is as high as in the molten, eventually leading to a very fast green single-band upconversion luminescence. Further, since the ratio of $Ω_4/Ω_6$ increases based on the rigidity of the solid medium, the liquid-quenched matrix produced in accordance with the present disclosure is generally considered to be considerably hard as a glass ($Ω_4/Ω_6$≈1).

Figure 3A:
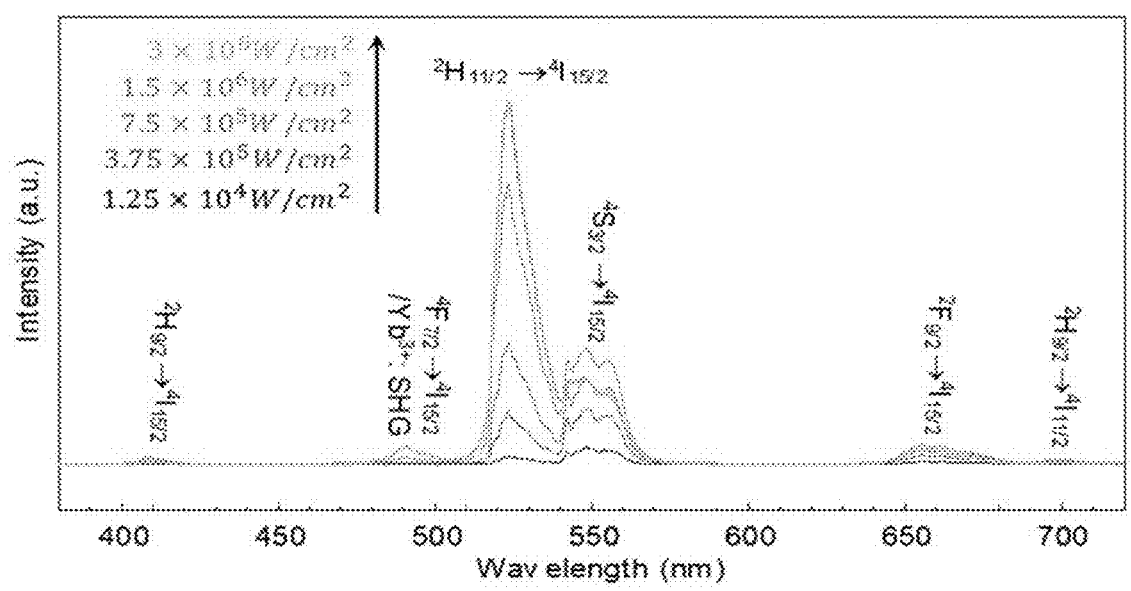
FIGS. 3A-3E show power dependence and time characteristics of liquid-quenched amorphous $NaYF_4:SiO_2$ doped with both $Yb^{3+}$ and $Er^{3+}$.
Figure 3B:
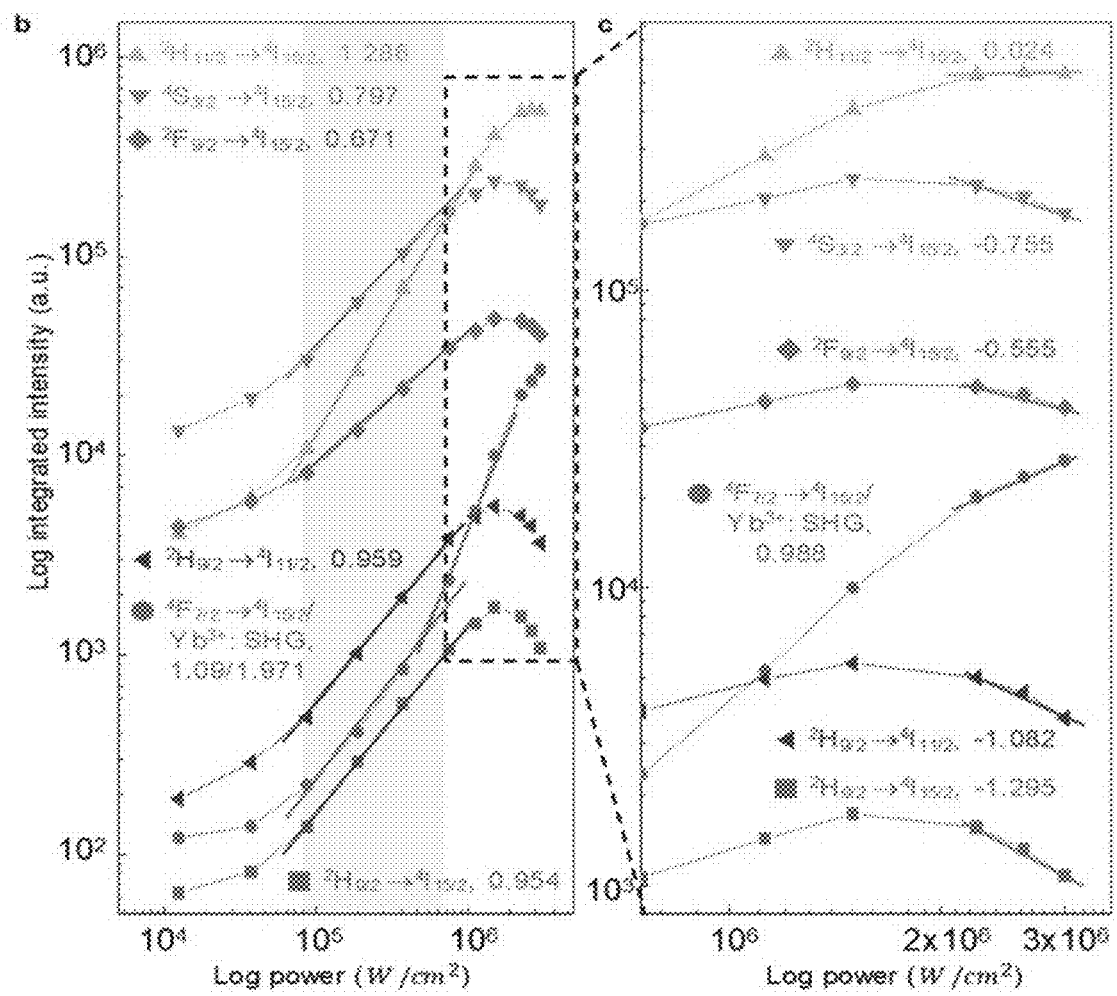
Figure 3C:
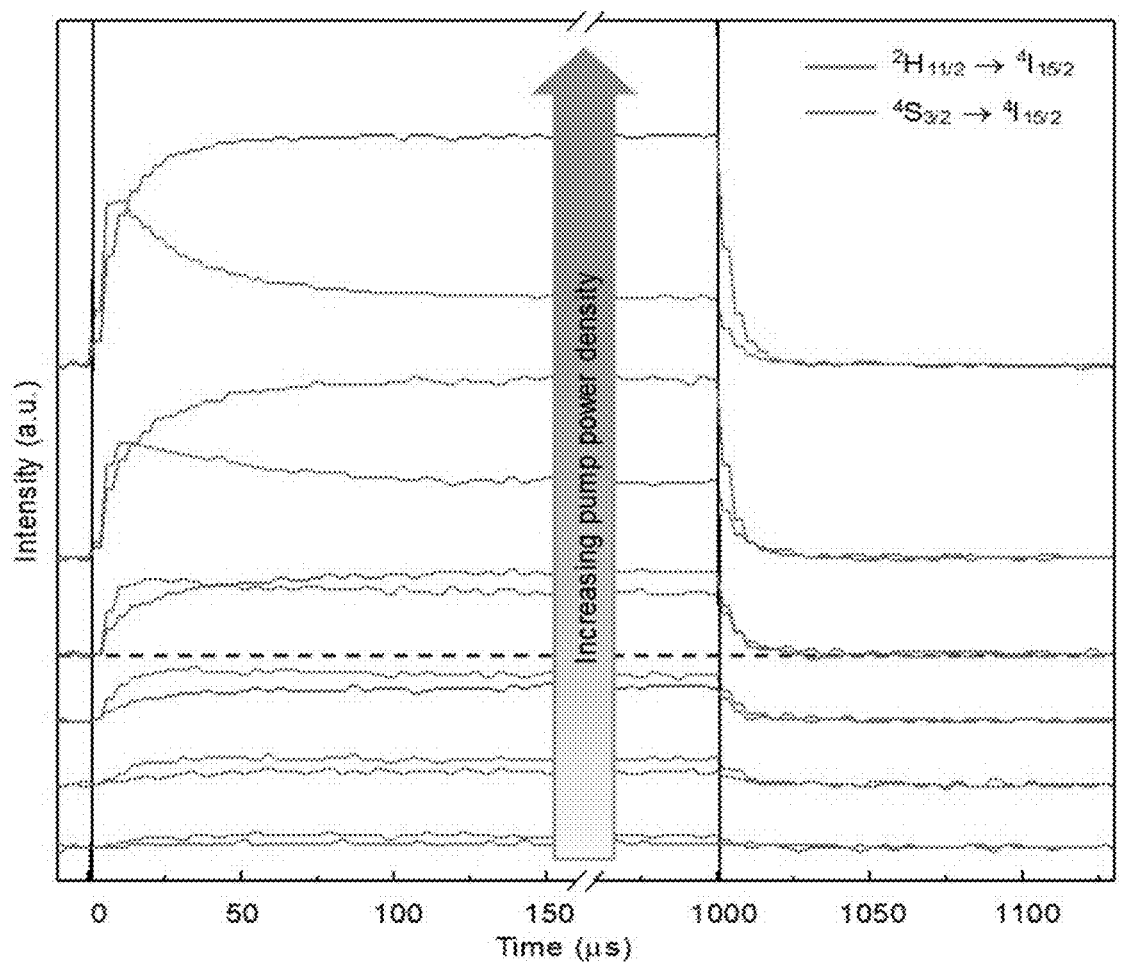
Figure 3D:
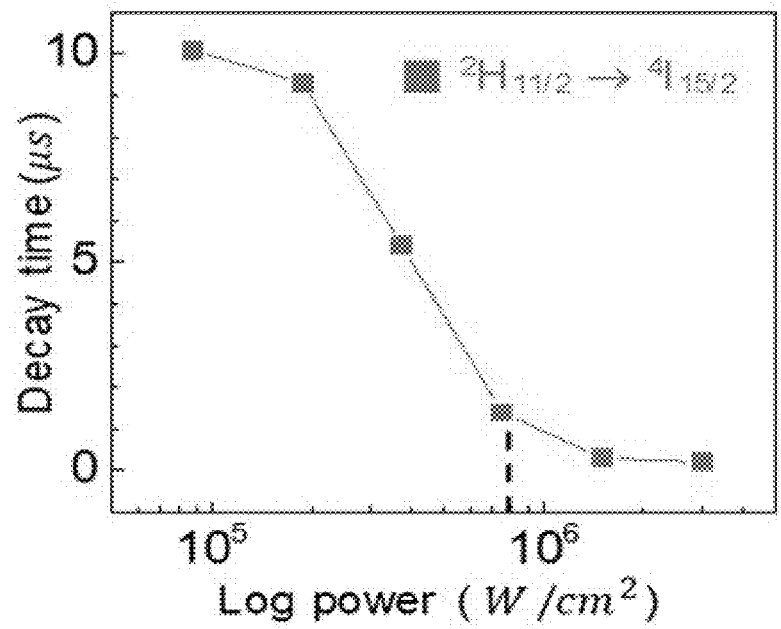
Figure 3E:
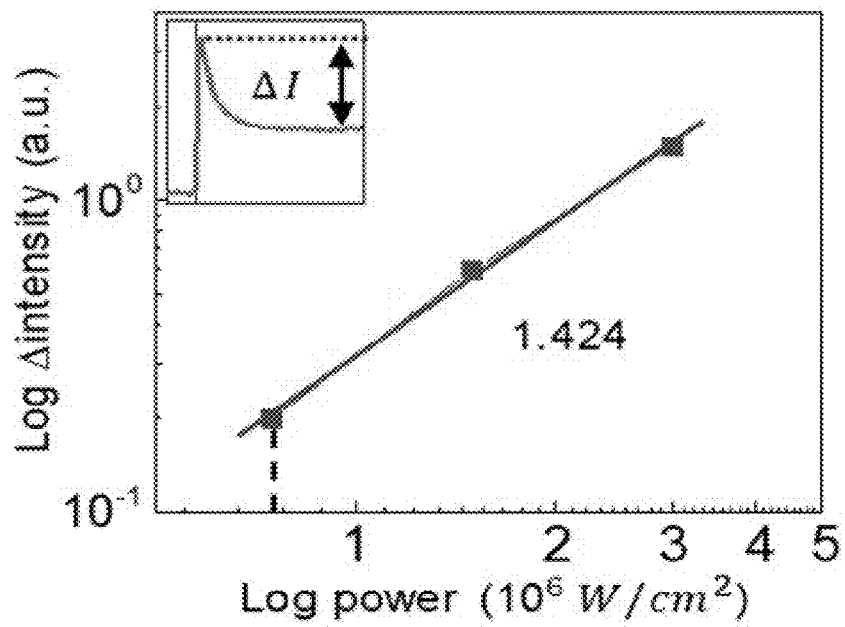

Power dependence and time characteristics of A-NaYF$_4$: SiO$_2$, Yb$^{3+}$, Er$^{3+}$ To identify the upconversion path for the single-band upconversion emission, the power dependence and time behavior of A-NaYF$_4$:SiO$_2$ were investigated at a pump power density of from 1.25×10$^4$ W/cm$^2$ to 3×10$^6$ W/cm$^2$. As the pump power density increased above 7.5×10$^4$ W/cm$^2$, the intensity of the $^2H_{11/2}$→$^4I_{15/2}$ transition increased sharply with the highest slope of 1.286 (FIG. 3A, and FIG. 3B) compared to other transitions (<1.1). Considering that a clear threshold output and a slope of about 2 occur, the shift of the slope for the 490 nm emission from 1.09 to 1.971 may be due to the second harmonic generation (SHG) of Yb$^{3+}$. In the high power density region above 1.5×10$^6$ W/cm$^2$, a slope reduction for all the transitions was observed. The slopes for the transitions fell to a negative value except for the SHG of Yb$^{3+}$ and $^2H_{11/2}$→$^4I_{15/2}$ transition of Er$^{3+}$ (FIG. 3C). This overall reduction in the slope may be due to the phonon-related temperature extinction effect that is inevitably involved in the high-power upconversion process. However, the extinction of the $^2H_{11/2}$→$^4I_{15/2}$ transition was insignificant compared to other transitions. As a result, an intense green single-band upconversion spectrum from A-NaYF$_4$: SiO2 was obtained at the highest pump power density. To clarify the cause of the lowered temperature extinction effect for the $^2H_{11/2}$→$^4I_{15/2}$ transition, the present inventor investigated the temporal behavior of thermally coupled $^2H_{11/2}$→$^4I_{15/2}$ and $^4S_{3/2}$→$^4I_{15/2}$ transitions at various pump output densities. When excited at a high power density, the intensity of the $^4S_{3/2}$→$^4I_{15/2}$ transition increased rapidly (1.6 μs) until a steady state was reached and then decreased (36.9 μs). This particular attenuation curve was found only in the $^4S_{3/2}$→$^2I_{15/2}$ transition among all transitions. Thus, it may be interpreted that this may be due to $^4S_{3/2}$→$^2H_{11/2}$ energy transfer by phonons. This was supported by an observed fact that when exceeding 7.5×10$^5$ W/cm$^2$, the decay time of $^2H_{11/2}$→$^4I_{15/2}$ transition decreased to smaller than microseconds (0.2 μs) unlike other transitions (FIG. 3E). This unexpected decrease in the decay time is a phenomenon occurring in an over-populated state. Thus, the electron density at the $^2H_{11/2}$ level is exceeded due to the $^4S_{3/2}$→$^2H_{11/2}$ energy transfer.

The intensity difference (ΔI) between the initial rise and subsequent decay was amplified with a slope of 1.424 based on the pump power density on a double logarithmic plot (FIG. 3F). This indicates that the $^4S_{3/2}$→$^2H_{11/2}$ energy transfer process is dominated mainly by the balance of rate equation. It is well known that the ratio between the $^2H_{11/2}$→$^4I_{15/2}$ and $^4S_{3/2}$→$^4I_{15/2}$ transitions is determined by Boltzmann distribution. However, the present disclosure reports, for the first time, the non-equilibrium dynamics occurring between the thermally coupled two energy levels in Ln$^{3+}$ due to the very fast excitation speed of the $^4S_{3/2}$ level in the liquid-quenched amorphous matrix.

Alternative Dopant to Ln$^{3+}$ as Embedded in Liquid-Quenched Amorphous Matrix

Figure 4A:
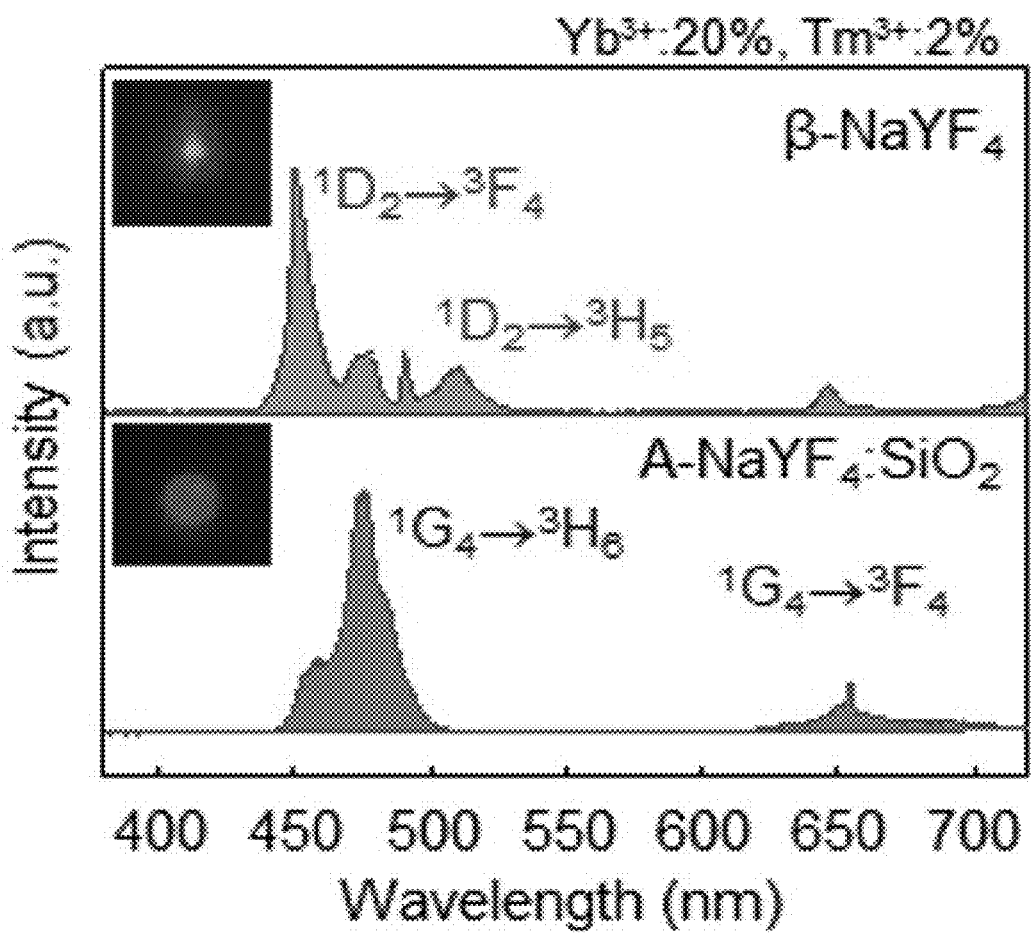
FIGS. 4A-4D show an example of single-band upconversion that occurs in $Tm^{3+}$, as an alternative to $Ln^{3+}$, that can be doped into a liquid-quenched amorphous matrix.
Figure 4B:
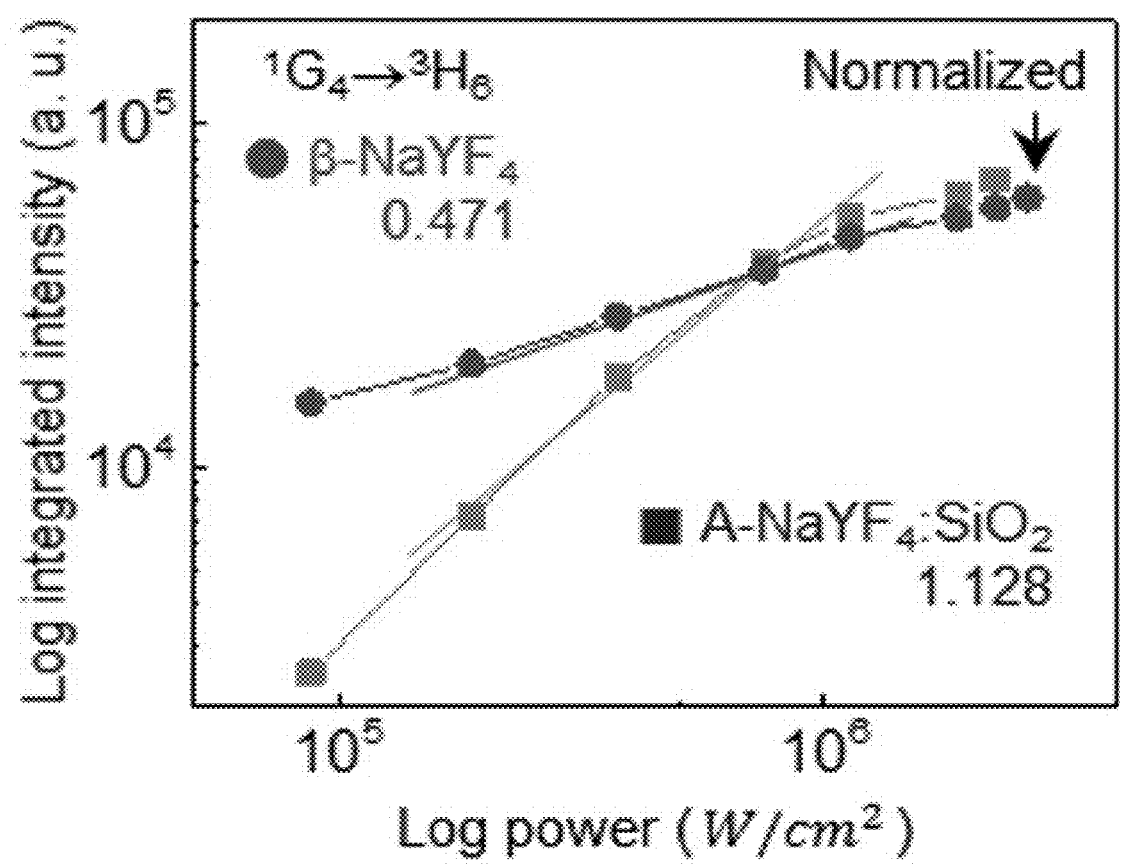
Figure 4C:
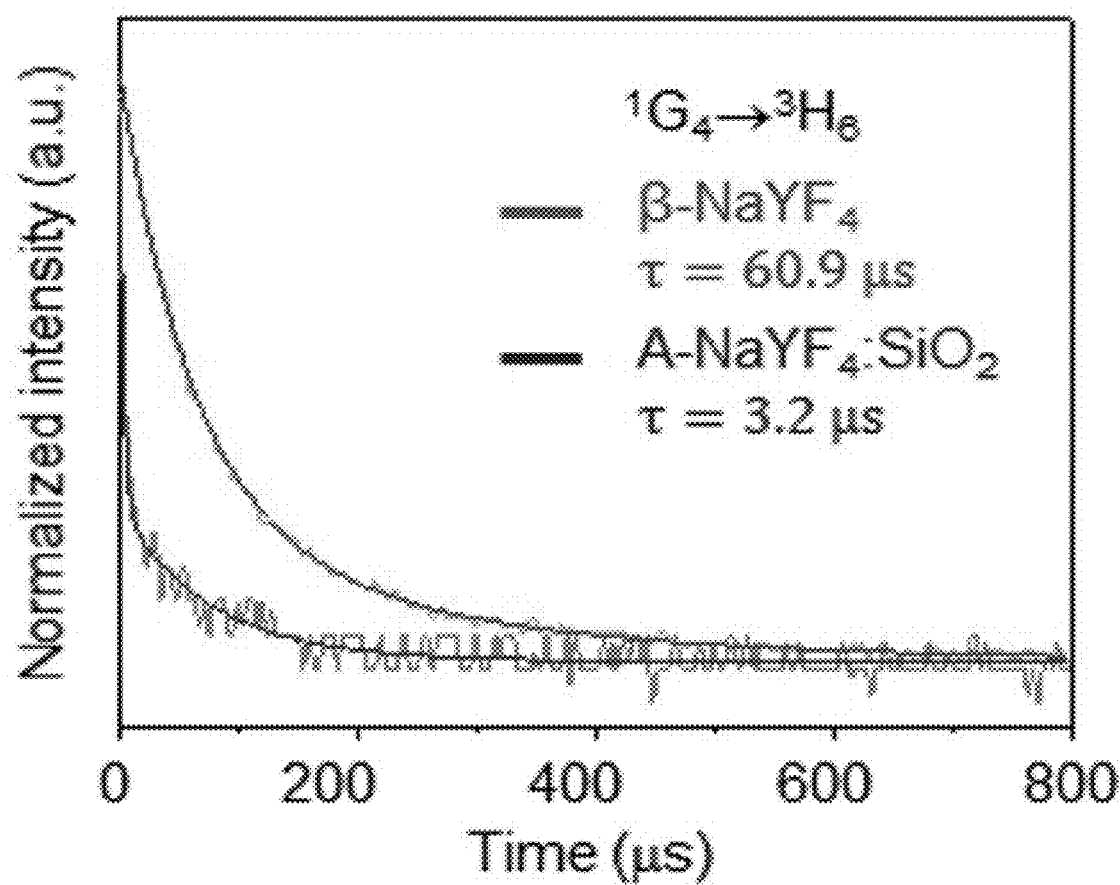
Figure 4D:
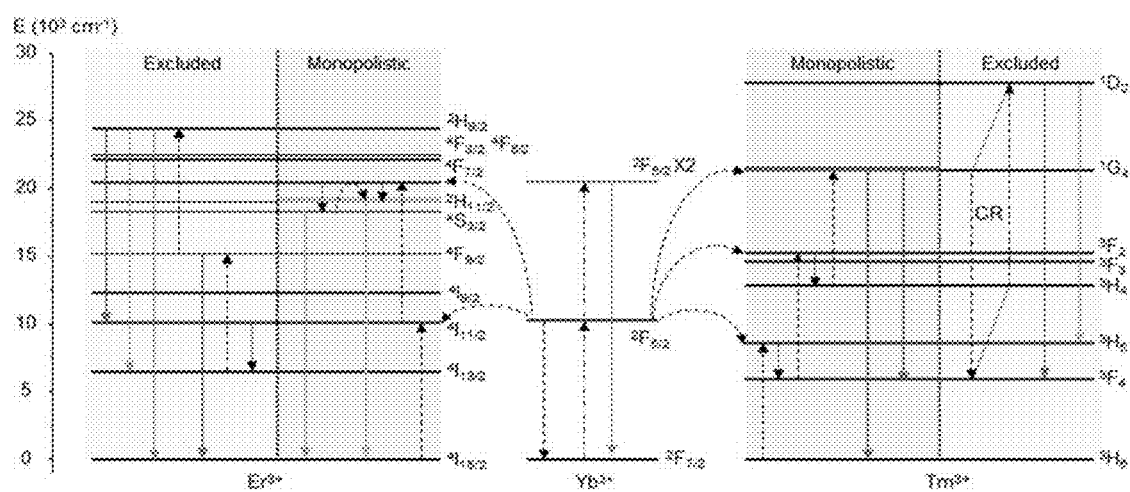

FIG. 4A shows the upconversion emission spectrum from β-NaYF$_4$ and A-NaYF$_4$:SiO$_2$ as doped with both Yb$^{3+}$ and Tm$^{3+}$ (20%, 2%) at 3×10$^6$ W/cm$^2$. FIG. 4B shows a comparison of the power dependence of $^1G_4$→$^3H_6$ transition which corresponds to an improved transition in a liquid-quenched amorphous matrix, and FIG. 4C shows a comparison of a decay time. The intensity was normalized to the intensity value at maximum power. FIG. 4D shows the mechanism proposed for the single-band upconversion in Er$^{3+}$ and Tm$^{3+}$, which receive the photon energy absorbed by Yb$^{3+}$. Dotted, dot-dashed, dashed, and solid lines indicate non-radiative relaxation, photon absorption, energy transfer, and upconversion emission, respectively. CR indicates cross-relaxation.

Single-band upconversion was also found in Tm$^{3+}$, which is embedded in a liquid-quenched amorphous matrix. The blue emission fron β-NaYF$_4$:Yb$^{3+}$ and Tm$^{3+}$ is due to $^1D_2$ excited by the cross-relaxation of $^1G_4$+$^3H_4$→$^3F_4$+$^1D_2$ transition instead of the energy transfer from Yb$^{3+}$. Conversely, in case of A-NaYF$_4$:SiO$_2$, Yb$^{3+}$ and Tm$^{3+}$, the most prominent emission comes from the $^1G_4$→$^3H_6$ transition (FIG. 4A), as one of the host-sensitive transitions; the A-NaYF$_4$: SiO$_2$, Yb$^{3+}$ and Tm$^{3+}$ exhibits a higher power dependence and much faster decay time than those in the crystalline phase (FIG. 4B, FIG. 4C). Although $^1D_2$→$^3F$ transition is sensitive to the host material, photon consumption via $^1G_4$→$^3H_6$ based fast radiation occurs, and, thus, cross-relaxation of the $^1D_2$→$^3F$ transition was pre-excluded. The proposed single-band upconversion mechanism in the liquid-quenched amorphous matrix is depicted in FIG. 4D. The intense single-band upconversion occurred at highly host-sensitive radiations/transitions (Er$^{3+}$: $^2H_{3/2}$→$^4I_{15/2}$, and Tm$^{3+}$: $^1G_4$→$^3H_6$). The present inventor found that additional energy transfer (such as cross-relaxation) was excluded out due to exclusive photon consumption.

In contrast, Ho$^{3+}$ did not show a single-band upconversion behavior in a liquid-quenched amorphous matrix. In Ho$^{3+}$, only the emission ratio of the two-photon upconversion transitions (($^5F_4$, $^5S_2$, $^5F_5$→$^5I_8$) as the major emission transition has been changed. This is interpreted to be due to the fact that the host-sensitive transition is absent among the two-photon upconversion transitions in Ho$^{3+}$. Although the present inventor could find host-sensitive transitions among the three-photon upconversion transition from the literatures, the three-photon upconversion may not be well suited to the mechanism as presented above due to the complex energy transfer phase.

CONCLUSION

Using the smallest non-radiative relaxation via direct manipulation of the transition probability as the basic property of the luminescent material may allow very efficient and ultra-fast green single-band upconversion to be realized in the liquid-quenched amorphous matrix doped with both $Yb^{3+}$ and $Er^{3+}$. The liquid-quenched amorphous matrix proposed in accordance with the present disclosure has excellent fast response times that were previously unsatisfactory and, thus, has great potential in future applications such as photonics integrated circuits that require high upconversion efficiencies. The present inventor believes that the ultrafast decay time of the luminescent material according to the present disclosure may enable new uses of the upconversion material in areas such as ultra-fast upconversion lasers, high-speed IR photon detection or digital information processing.

Production Method

Materials $ErCl_3.6H_2O$ (99.9%), $YCl_3.6H_2O$ (99.9%), $YbCl_3.6H_2O$ (99.9%), $TmCl_3.6H_2O$ (99.9%), $HoCl_3.6H_2O$ (99.9%), NaOH (98+%), $NH_4F$ (98+%), 1-octadecene (ODE) (90%), oleic acid (OA) (90%), Igepal CO-520, $NH_3$—$H_2O$ (30 wt %), and tetraethyl orthosilicate (TEOS) (99.0+%) were purchased from Sigma-Aldrich. All chemicals were used as received without further purification.

Synthesis of Nanocrystals:

Lanthanide element-doped hexagonal (β)-$NaYF_4$ based upconversion nanocrystals and $SiO_2$-coated nanocrystals were synthesized using a reference method (Li, Z., Zhang, Y. & Jiang, S. Multicolor Core/Shell-Structured Upconversion Fluorescent Nanoparticles. *Advanced Materials* 20, 4765-4769, doi: 10.1002/adma.200801056 (2008)).

To synthesize upconversion nanocrystals, $YCl_3.6H_2O$ (236.6 mg, 0.78 mmol), $YbCl_3.6H_2O$ (77.498 mg, 0.2 mmol) and $ErCl_3.6H_2O$ (7.634 mg, 0.02 mmol) were added to a 250-ml flask containing 15 ml of ODE and 6 ml of OA. The mixture was vigorously stirred using a glass-coated stirrer and heated at 160° C. for 1 h under an Ar atmosphere to remove $H_2O$ and $O_2$ before being cooled to 25° C.; the mixture at this stage was yellowish and transparent. Next, 10 ml of methanol containing $NH_4F$ (0.1482 g, 4 mmol) and NaOH (0.1 g, 2.5 mmol) was added dropwise in the prepared solution and the resulting white opaque mixture was then stirred another 30 min. To remove the methanol, the solution was heated at 120° C. for 1 h, followed by heating to 320° C. to induce nucleation and growth of nanocrystals. After cooling, the nanocrystals were collected by centrifugation, re-dispersed in cyclohexane, and then washed twice with copious amounts of ethanol. Finally, the synthesized nanocrystals (1 mmol) were stored in 10 ml of cyclohexane before use. To coat an $SiO_2$ thin layer onto the nanocrystals, Igepal CO-520 (0.5 ml), cyclohexane (9.6 ml) and prepared β-$NaYF_4$ nanocrystal solution (0.4 ml) were mixed in a 20-ml glass vial and then stirred for 30 min before 0.08 ml of $NH_3.H_2O$ was added. After TEOS (0.04 ml) was injected quickly into the solution, the container was sealed hermetically and stirred at 900 rpm for 24 h. β-$NaYF_4$@$SiO_2$ nanoparticles were precipitated by adding methanol, re-dispersed in ethanol, washed with excessive cyclohexane three times, and then stored in DI water (10 ml).

Optical Setup and Characterization:

An inverted optical microscope (Olympus, IX73) was equipped with a single-mode 980 nm diode laser (RGB photonics, Lambda beam PB 980-250 mW). The samples were observed using an oil-type 100× objective, and the same objective lens was simultaneously used to obtain the focused laser spot (2 μm×4 μm) with a power density ranging from $1.25 \times 10^4$ to $3 \times 10^6$ W $cm^{-2}$ on the sample. A spectrograph (Andor, Shamrock 303i) with a 1200 lines/mm grating (500 nm centered) and an EMCCD (Andor, DU970P) were used for spectral analysis over the full visible range from 380 to 720 nm. Subsequently, a narrow spectral range (~5 nm) of the grated spectrum was selected by an external slit for accurate temporal behavior measurement of each transition. An arbitrary function generator (Rigol, DG4102) and an oscilloscope (Rigol, DS2102A-S) equipped with a Si-APD (Thorlabs, APD410A/M) were synchronized before the measurement. All of the aforementioned components of the optical setup are detailed in the scheme in Supplementary FIG. S1. Rise and decay curves were fitted with double-exponential functions to calculate the rise and decay times using the equation $y=y_0+A_1 \exp^{-(x-x_0)/t_1}+A_2\exp^{-(x-x_0)/t_2}$. In accordance with the present disclosure, only dominant life spans ($\tau_1$) among the life span values ($\tau_1$, $\tau_2$) were compared for the temporal behavior analysis.

Synthesis of Liquid-Quenched Amorphous Matrix:

Forty microliters of β-$NaYF_4$@ $SiO_2$ nanoparticles in DI water were deposited onto a Si wafer and then simply dried at 65° C. The fully dried sample was then heat-treated in a tube furnace at 250° C. for 12 h under low vacuum of $7.0 \times 10^{-2}$ Torr to prevent undesirable oxidation. After naturally cooling, the prepared sample was moved to a finder grid (Ted Pella, Ni grid, G400F1-N3) through simple rubbing. The attached sample was in the form of crumbs (see FIG. S2 in the Supporting Information). These pretreatments were performed to promote the laser melting process. Next, the heat was induced by laser irradiation to liquefy the precursors; the molten material was then spontaneously quenched by the removal of the surface effect. The liquid-quenching process was initiated and terminated instantly under a maximum power of the focused laser spot (under a 980 nm CW laser of $3 \times 10^6$ W $cm^{-2}$).

TEM Cross-Sectional Imaging, SAED and EDS Analyses:

As-synthesized A-$NaYF_4$:$SiO_2$ was easily located by the coordination of the finder grid. The cross-sectional sample of the thin film was prepared by FIB milling (JEOL, JIB-4601F, Ga ion source) for HRTEM images (JEOL, JEM ARM 200F), SAED and EDS analyses.

The illustrations of the presented embodiments are provided so that a person of ordinary skill in the art of the present disclosure may use or implement the present disclosure. Various modifications to these embodiments will be readily apparent to those skilled in the art of the present disclosure. The general principles defined herein may be applied to other embodiments without departing from the scope of the present disclosure. Thus, the present disclosure is not to be construed as limited to the embodiments set forth herein but rather to be accorded the widest scope consistent with the principles and novel features set forth herein.

What is claimed is:

1. A single-band upconversion luminescent material comprising:
   an amorphous ceramic host; and
   lanthanide ions doped into the ceramic host.

2. The single-band upconversion luminescent material of claim 1, wherein the amorphous ceramic host is an amorphous matrix resulting from liquid-quenching of a crystalline ceramic.

3. The single-band upconversion luminescent material of claim 1, wherein the amorphous ceramic host has a non-glass state.

4. The single-band upconversion luminescent material of claim 1, wherein the ceramic amorphous host has a relative value $\Omega^r{}_2(\Omega_2/\Sigma\Omega_\lambda)$ of Judd-Ofelt parameters $\Omega_2$, $\Omega_4$ and $\Omega_6$ being equal to or greater than 0.75.

5. The single-band upconversion luminescent material of claim 1, wherein the amorphous ceramic host is a host containing $NaYF_4$ or $Y_2O_3$.

6. The single-band upconversion luminescent material of claim 5, wherein the lanthanide ions include $Er^{3+}$ or $Tm^{3+}$ ions.

7. The single-band upconversion luminescent material of claim 6, wherein the single-band upconversion luminescent material exhibits upconversion emission to blue and green regions.

8. The single-band upconversion luminescent material of claim 6, wherein the lanthanide ions include $Er^{3+}$ ions, wherein the single-band upconversion luminescent material has a $^2H_{11/2} \rightarrow {}^4I_{15/2}$ transition possibility.

9. The single-band upconversion luminescent material of claim 6, wherein the lanthanide ions include $Tm^{3+}$ ions, wherein the single-band upconversion luminescent material has a $^1G_4 \rightarrow {}^3H_6$ transition possibility.

10. The single-band upconversion luminescent material of claim 1, wherein the ceramic amorphous host contains an amorphous phase stabilizer.

11. The single-band upconversion luminescent material of claim 10, wherein the amorphous phase stabilizer includes $SiO_2$ or $TiO_2$.

12. The single-band upconversion luminescent material of claim 1, wherein the upconversion luminescent material has an asymmetric and covalent bond-based microstructure.

13. The single-band upconversion luminescent material of claim 1, wherein the upconversion luminescent material has a decay time smaller than or equal to 0.2 µs.

14. A method for producing a single-band upconversion luminescent material, the method comprising:
providing ceramic nanocrystals doped with lanthanide ions;
coating an amorphous phase stabilizer on the ceramic nanocrystals;
fully melting the ceramic nanocrystals to form a melt; and
liquid-quenching the melt.

15. The method of claim 14, wherein the fully melting comprises fully melting the nanocrystals using a focused laser beam.

16. The method of claim 15, wherein a diameter of a spot of the laser beam is equal to or smaller than 4 µm.

17. The method of claim 14, wherein the ceramic nanocrystals include $NaYF_4$ or $Y_2O_3$ nanocrystals.

18. The method of claim 14, wherein the ceramic of the ceramic nanocrystals includes $NaYF_4$ or $Y_2O_3$.

19. The method of claim 14, wherein the lanthanide ions include $Er^{3+}$ or $Tm^{3+}$ ions.

20. The method of claim 14, wherein the amorphous phase stabilizer includes $SiO_2$ or $TiO_2$.

21. A single-band upconversion luminescent material produced using the method of claim 14, wherein the single-band upconversion luminescent material comprises:
an amorphous ceramic host; and
lanthanide ions doped into the ceramic host.

22. The single-band upconversion luminescent material of claim 21, wherein the amorphous ceramic host has a non-glass state.

23. The single-band upconversion luminescent material of claim 21, wherein the ceramic amorphous host has a relative value $\Omega^r_2 (\Omega_2/\Sigma\Omega_\lambda)$ of Judd-Ofelt parameters $\Omega_2$, $\Omega_4$ and $\Omega_6$ being equal to or greater than 0.75.

24. The single-band upconversion luminescent material of claim 21, wherein the upconversion luminescent material has an asymmetric and covalent bond-based microstructure.

25. The single-band upconversion luminescent material of claim 21, wherein the single-band upconversion luminescent material has a $^2H_{11/2} \rightarrow {}^4I_{15/2}$ transition possibility.

26. The single-band upconversion luminescent material of claim 21, wherein the upconversion luminescent material has a decay time smaller than or equal to 0.2 µs.

27. The single-band upconversion luminescent material of claim 21, wherein the amorphous ceramic host is a host containing $NaYF_4$ or $Y_2O_3$.

28. The single-band upconversion luminescent material of claim 27, wherein the lanthanide ions include $Er^{3+}$ or $Tm^{3+}$ ions.

29. The single-band upconversion luminescent material of claim 10, wherein the amorphous phase stabilizer includes $SiO_2$ or $TiO_2$.

30. The single-band upconversion luminescent material of claim 28, wherein the single-band upconversion luminescent material exhibits upconversion emission to blue and green regions.

31. The single-band upconversion luminescent material of claim 27, wherein the lanthanide ions include $Er^{3+}$ ions, wherein the single-band upconversion luminescent material has a $^2H_{11/2} \rightarrow {}^4I_{15/2}$ transition possibility.

32. The single-band upconversion luminescent material of claim 27, wherein the lanthanide ions include $Tm^{3+}$ ions, wherein the single-band upconversion luminescent material has a $^1G_4 \rightarrow {}^3H_6$ transition possibility.

\* \* \* \* \*